US012151450B2

(12) United States Patent
Pieroni et al.

(10) Patent No.: US 12,151,450 B2
(45) Date of Patent: Nov. 26, 2024

(54) MACHINE AND METHOD FOR EMBOSSING PAPER WEB PRODUCTS

(71) Applicant: Korber Tissue S.p.A., Lucca (IT)

(72) Inventors: Riccardo Pieroni, Lucca (IT); Matteo Galoppini, Lucca (IT)

(73) Assignee: Korber Tissue, S.p.A., Lucca (IT)

( * ) Notice: Subject to any disclaimer, the term of this patent is extended or adjusted under 35 U.S.C. 154(b) by 0 days.

(21) Appl. No.: 17/918,216

(22) PCT Filed: Mar. 15, 2021

(86) PCT No.: PCT/IB2021/052132

§ 371 (c)(1),
(2) Date: Oct. 11, 2022

(87) PCT Pub. No.: WO2021/205253

PCT Pub. Date: Oct. 14, 2021

(65) Prior Publication Data

US 2023/0146893 A1 May 11, 2023

(30) Foreign Application Priority Data

Apr. 10, 2020 (IT) ........................ 102020000007735

(51) Int. Cl.
*B31F 1/07* (2006.01)

(52) U.S. Cl.
CPC ........ *B31F 1/07* (2013.01); *B31F 2201/0715* (2013.01); *B31F 2201/0779* (2013.01); *B31F 2201/0782* (2013.01); *B31F 2201/0784* (2013.01); *B31F 2201/0787* (2013.01)

(58) Field of Classification Search
None
See application file for complete search history.

(56) References Cited

U.S. PATENT DOCUMENTS

| | | | | |
|---|---|---|---|---|
| 3,556,907 | A | 1/1971 | Nystrand | |
| 6,746,558 | B2 | 6/2004 | Hoeft et al. | |
| 8,999,095 | B2 | 4/2015 | Sauter et al. | |
| 2005/0247397 | A1 * | 11/2005 | Kraus ...................... | B31F 1/07 162/111 |

(Continued)

FOREIGN PATENT DOCUMENTS

| | | | |
|---|---|---|---|
| DE | 19654249 | A1 | 6/1998 |
| EP | 1075387 | B1 | 11/2003 |

(Continued)

*Primary Examiner* — Barbara J Musser
(74) *Attorney, Agent, or Firm* — Breiner & Breiner, L.L.C.

(57) ABSTRACT

A machine for embossing, including at least one pair of embossing nips for plies of paper, at least one laminating nip to bond the plies of paper, a pair of embossing cylinders, each having on its surface a respective plurality of embossing protrusions, each defining a wrap angle for the at least one ply of paper, and defining therebetween a transfer nip, a pair of pressure cylinders, each associated with a respective one of the embossing cylinder, the embossing nip being defined between each pair formed of embossing cylinder and pressure cylinder, a laminating device for bonding the plies delivered from the transfer nip, at least one distribution device of material to facilitate ply-bonding arranged upstream of the laminating device, and at least one heating device for at least one of the embossing cylinders.

26 Claims, 19 Drawing Sheets

(56) References Cited

U.S. PATENT DOCUMENTS

| | | | | |
|---|---|---|---|---|
| 2008/0251956 | A1* | 10/2008 | Korhonen | F16C 13/024<br>425/149 |
| 2017/0008246 | A1* | 1/2017 | Mäntylä | B31F 1/2872 |

FOREIGN PATENT DOCUMENTS

| | | | | |
|---|---|---|---|---|
| EP | 1239079 | B1 | 6/2007 | |
| EP | 1319748 | B9 | 11/2011 | |
| EP | 1855876 | B1 | 2/2012 | |
| JP | 2007136861 | A | 7/2007 | |
| WO | WO-2018229676 | A1 * | 12/2018 | B31F 1/07 |

* cited by examiner

MACHINE AND METHOD FOR EMBOSSING PAPER WEB PRODUCTS

TECHNICAL FIELD

There are described methods and machines for producing multi-ply cellulose web material, for example and in particular tissue paper web material.

BACKGROUND ART

In the tissue paper production and converting sector, to obtain products such as rolls of toilet paper, kitchen towels, napkins and facial tissues, or the like, it is known to unwind a plurality of cellulose fiber plies from one or more parent reels and convert the plies into a semi-finished or finished product, which comprises two or more plies bonded to one another.

Bonding of the cellulose fiber plies for the production of a multi-ply web material frequently takes place using a glue or through mechanical ply-bonding, i.e., obtained by pressing one ply against the other at high pressure. For this purpose, at least one of the cellulose fiber plies is embossed by means of an embossing cylinder and a pressure roller, typically coated in an elastically yielding material. Through embossing, the cellulose fiber ply is permanently deformed, forming embossed protrusions. While the cellulose fiber ply is still adhering to the embossing cylinder, glue is applied to the embossing protrusions. Subsequently, a second ply is superimposed on the embossed cellulose fiber ply and the two plies are pressed against each other in the areas that received the glue to cause their mutual adhesion.

Two or more plies, at least one, some or all embossed, are then bonded to form a multi-ply web material. The web material can be wound to form rolls, or cut and folded to form facial tissues, napkins or the like.

In addition to allowing the mutual adhesion of the cellulose fiber plies, embossing also has the purpose of improving the quality of the multi-ply paper product. For example, it is possible to increase the thickness of each single ply so as to obtain an increase in volume or of the diameter of the finished product, in the case in which the cellulose material ply or plies are wound in rolls. In other cases, it is possible to increase the mechanical strength of the plies, i.e., the ultimate tensile strength, or to increase the absorbency or softness.

For these reasons, many methods and machines for embossing cellulose material plies have been developed, as described in EP1075387, EP1855876, U.S. Pat. No. 3,556,907, EP1239079, EP1319748 and U.S. Pat. No. 6,746,558.

SUMMARY

The aim of the present invention is to provide machines and methods for improving the known processes for embossing webs of cellulose material, and in particular for improving the properties of these webs of cellulose material.

Within the aim, an important object of the present invention is to produce a machine and/or a method that are able to improve the compactness of the web of cellulose material.

Another important object of the present invention is to produce a machine and/or a method that are able to improve the volume of the web of cellulose material.

Yet another important object of the present invention is to produce a machine and/or a method that are able to improve the softness of the web of cellulose material.

A further important object of the present invention is to produce a machine and/or a method that are able to improve the strength of the web of cellulose material.

Another important object of the present invention is to produce a machine and/or a method that are able to improve the adhesion between the plies of the web of cellulose material.

These and other objects, which will be more apparent below, are achieved, according to a first aspect, with a machine for embossing paper web products with two or more plies of paper web, comprising

- at least one pair of embossing nips for plies of paper,
- at least one laminating nip to bond said plies of paper,
- at least two feed paths for plies of paper from the entrance to the machine toward said laminating nip,
- a pair of embossing cylinders, each having on its surface a respective plurality of embossing protrusions, each defining a section of a said path for at least one said ply in the form of a wrap angle for said at least one ply of paper, and defining therebetween a transfer nip for plies of paper,
- a pair of pressure cylinders, each side by side with a respective said embossing cylinder, said embossing nip being defined between each pair formed of embossing cylinder and pressure cylinder,
- a laminating device for the assembly of plies delivered from said transfer nip, to bond said plies,
- at least one distribution device of material to facilitate ply-bonding arranged along a said path of at least one ply upstream of said laminating device,
- at least one heating device for at least one of said embossing cylinders.

The use of the heated cylinder allows the processing of plies of paper with a moisture content equal to or greater relative to the prior art in order to improve the features of the plies. The improvements concern the compactness, volume and mechanical strength of the single paper ply and of the paper product deriving therefrom. In particular, the heat transferred by the embossing roller to the respective paper ply strengthens the plastic deformation generated by the embossing pressure. In some cases, more than one superimposed paper ply can be fed to a single embossing cylinder, obtaining the further advantage of an improved adhesion of the superimposed paper plies in addition to the aforesaid technical and functional advantages.

In the present context the term "embossing" relates to a permanent deformation process of a portion of a cellulose structure, such as a ply or a multi-ply sheet, orthogonally to the plane on which it lies, through which the cellulose structure is permanently deformed with the formation of protrusions or protuberances that project from the normal plane on which the cellulose structure lies, for example the plane on which the ply (or the multi-ply web material, if embossing is carried out on a multi-ply material) lies.

An embossing device in general is meant as a device that carries out an embossing process on at least one ply and if necessary bonds two or more plies to each other by lamination, for example using a glue applied to at least one of these plies, preferably to the top surfaces of at least some of the embossing protrusions formed on one or more plies.

"Outer surface" of the embossing cylinder is meant as the whole area comprising the front surfaces of the embossing protrusions, the sides of the embossing protrusions and the surface of the plane on which the roller from which the embossing protrusions project outward lies.

In accordance with a 2nd aspect, the invention relates to an embossing machine according to the first aspect, wherein the material to facilitate ply-bonding is water based, so that the distribution device of material to facilitate ply-bonding, by means of the distribution of said material to facilitate ply-bonding on at least one ply, is adapted to transfer moisture to said at least one ply to promote ply-bonding.

In accordance with a 3rd aspect, the invention relates to an embossing machine according to the 2nd aspect, wherein the at least one distribution device of material to facilitate ply-bonding comprises a water based fluid distributor.

In accordance with a 4th aspect, the invention relates to an embossing machine according to the 1st, 2nd or 3rd aspect, wherein said at least one distribution device of material to facilitate ply-bonding comprises a fluid adhesive material distributor.

In accordance with a 5th aspect, the invention relates to an embossing machine according to one or more of the preceding aspects, wherein said at least one distribution device of material to facilitate ply-bonding is arranged close to the wrap angle of one said embossing cylinder for the distribution of material to facilitate ply-bonding on the ply of paper moving along said wrap angle.

In accordance with a 6th aspect, the invention relates to an embossing machine according to the preceding aspect, wherein said at least one distribution device of material to facilitate ply-bonding is arranged close to the wrap angle of one said embossing cylinder adapted to be heated by said heating device.

In accordance with a 7th aspect, the invention relates to an embossing machine according to one or more of the 2nd to the 6$^{th}$ aspects, comprising a system to control the amount of moisture that can be transferred from said distribution device of water based material to facilitate ply-bonding to said at least one ply.

In accordance with an 8th aspect, the invention relates to an embossing machine according to the preceding aspect, wherein said system to control the amount of moisture that can be transferred is a function of the feed speed of said at least one ply on which said material to facilitate ply-bonding is distributed along said path, so that when said speed increases, the amount of moisture transferred to said at least one ply decreases, or vice versa.

In accordance with a 9th aspect, the invention relates to an embossing machine according to the 7th or 8th aspect, wherein said system to control the amount of moisture that can be transferred comprises a regulator of the flow rate or of the pressure of the fluid distributed.

In accordance with a 10th aspect, the invention relates to an embossing machine according to one or more of the preceding aspects, wherein said distribution device of material to facilitate ply-bonding comprises a distributor of water based liquid forming said material to facilitate ply-bonding, which is provided with a distributing roller facing a said embossing roller, said distributing roller collecting on its surface said water based liquid and distributing said liquid on said at least one ply moving over said embossing roller.

In accordance with an 11th aspect, the invention relates to an embossing machine according to the 7th and 10th aspect, wherein said distributor of water based liquid comprises a said system to control the amount of moisture that can be transferred, said system being provided with a device to control the relative pressure of said distributing roller on said embossing roller.

In accordance with a 12th aspect, the invention relates to an embossing machine according to the 4th and 11th aspects, wherein said fluid adhesive material is a said water based liquid and said fluid adhesive material distributor comprises a said device to control the relative pressure of said distributing roller on said embossing roller.

In accordance with a 13th aspect, the invention relates to an embossing machine according to one or more of the 4th to the 12$^{th}$ aspects, wherein said fluid adhesive material distributor comprises a device to dilute the fluid adhesive material distributed, as a function of the heating carried out by said heating device, preferably such that the dilution of said fluid adhesive material increases as the heating carried out by said device increases and/or the contact time between said ply and said embossing roller increases; said fluid adhesive material distributor preferably being arranged close to the wrap angle of one said embossing cylinder adapted to be heated by said heating device, a control system preferably being provided so that when the temperature of the embossing cylinder increases, the fluid adhesive material being distributed is diluted; a temperature sensor preferably being provided on said embossing cylinder.

In accordance with a 14th aspect, the invention relates to an embossing machine according to one or more of the preceding aspects, wherein said at least one distribution device of material to facilitate ply-bonding comprises a steam distributor arranged along a said feed path of at least one ply in said machine, adapted to distribute steam on said at least one ply.

In accordance with a 15th aspect, the invention relates to an embossing machine according to the 7th and 14th aspects, comprising a said system to control the amount of moisture that can be transferred from said steam distributor to said at least one ply, preferably by means of a regulator of the flow rate or of the pressure of the steam distributed; preferably comprising a moisture sensor arranged on the path of said plies bonded downstream of said laminating device, operatively connected to said moisture control system adapted to act on said steam distributor for the regulation thereof.

In accordance with a 16th aspect, the invention relates to an embossing machine according to the 14th or 15$^{th}$ aspect, wherein said steam distributor is facing the wrap angle of one said embossing cylinder or said pressure cylinder so as to vaporize the at least one ply present on said embossing cylinder or on said pressure cylinder, or is arranged along a section of path of the at least one ply in which it is free from supports, i.e., a free hanging section in air.

In accordance with a 17th aspect, the invention relates to an embossing machine according to the above-mentioned 1st aspect, wherein said at least one distribution device of material to facilitate ply-bonding comprises at least one of the following:

- a fluid adhesive material distributor arranged close to the wrap angle of one said embossing cylinder for the distribution of adhesive material on the ply of paper moving along said wrap angle,
- a steam distributor arranged along a said feed path of at least one ply in said machine, adapted to distribute steam on said at least one ply.

In accordance with an 18th aspect, the invention relates to an embossing machine according to the above-mentioned 17th aspect, wherein said steam distributor is facing the wrap angle of one said embossing cylinder or said pressure cylinder so as to vaporize the at least one ply present on said embossing cylinder or on said pressure cylinder, or is arranged along a section of path of the at least one ply in which it is free from supports, i.e., a free hanging section.

In accordance with a 19th aspect, the invention relates to an embossing machine according to the above-mentioned 18th aspect, wherein said steam distributor comprises a steam distributing area and an area for drawing off the steam not absorbed by the at least one ply.

In accordance with a 20th aspect, the invention relates to an embossing machine according to the above-mentioned 17th, 18th or 19th aspect, wherein said steam distributor is associated with a moisture sensor arranged along the path of said plies bonded downstream of said laminating device, operatively connected to a moisture control system adapted to regulate said steam distributor.

In accordance with a 21st aspect, the invention relates to an embossing machine according to the above-mentioned 17th aspect, wherein said fluid adhesive material distributor comprises a dilution device of the fluid adhesive material distributed, as a function of the heating carried out by said heating device, preferably such that the dilution of said fluid adhesive material increases as the heating carried out by said device increases; said fluid adhesive material distributor preferably being arranged close to the wrap angle of one said embossing cylinder adapted to be heated by said heating device, a temperature sensor on said embossing cylinder and a control system preferably being provided so that when the temperature detected by the sensor increases, the fluid adhesive material being distributed is diluted.

In accordance with a 22nd aspect, the invention relates to an embossing machine according to one or more of the preceding aspects, wherein said laminating device is provided with a pressing member defining a laminating nip with one said embossing cylinder.

In accordance with a 23rd aspect, the invention relates to an embossing machine according to the above-mentioned 22nd aspect, wherein said pressing member comprises a laminating cylinder facing said embossing cylinder to define said laminating nip.

In accordance with a 24th aspect, the invention relates to an embossing machine according to the above-mentioned 22nd aspect, wherein said pressing member comprises a plurality of small rollers close to one another and defining a contrast surface.

In accordance with a 25th aspect, the invention relates to an embossing machine according to the above-mentioned 24th aspect, wherein said small rollers are preferably arranged approximately coaxially on a first row, each of said small rollers having a cylindrical surface provided with protrusions, wherein the axis of the first row of approximately coaxial rollers is approximately parallel to the rotation axis of the embossing cylinder.

In accordance with a 26th aspect, the invention relates to an embossing machine according to the above-mentioned 25th aspect, wherein said small rollers are arranged preferably approximately coaxially also on a second row, each of said small rollers having a cylindrical surface provided with protrusions, and wherein the first row of small rollers and the second series of small rollers have axes mutually parallel and spaced around a circumference of the embossing cylinder.

In accordance with a 27th aspect, the invention relates to an embossing machine according to the above-mentioned 22nd aspect, wherein said pressing member comprises a heating device, of the type with electrical heating element, with magnetic induction heating of the rollers, or with a steam or oil heated heat exchanger.

In accordance with a 28th aspect, the invention relates to an embossing machine according to one or more of the preceding aspects, wherein said heating device is internal to said first and/or second embossing cylinder, or external to said first and/or second embossing cylinder, i.e., adapted to heat the embossing surface of said first and/or second embossing cylinder from the outside.

In accordance with a 29th aspect, the invention relates to an embossing machine according to the above-mentioned 28th aspect, wherein said heating device

- when internal, comprises, for example, at least one gap inside the embossing cylinder into which a heated fluid, such as oil, water, steam or air, is fed by means of a system (alternatively the fluid can be heated directly in the gap); alternatively it can comprise electric heating elements arranged internally, close to the surface, adapted to heat the cylinder by Joule effect;
- when external, comprises an external heating device facing the surface of the cylinder, which transmits heat to the cylinder, for example a halogen lamp device, a heating element device, a flame device, a heat exchanger device or a magnetic induction device adapted to generate eddy currents on the surface of the embossing cylinder.

In accordance with a 30th aspect, the invention relates to an embossing machine according to one or more of the preceding aspects, wherein at least one said heating device is associated with at least one said embossing cylinder and said wrap angle of said at least one heated embossing cylinder is comprised between 15° and 345°, more preferably between 30° and 330°.

In accordance with a 31st aspect, the invention relates to an embossing machine according to one or more of the preceding aspects, wherein at least one said heating device is associated with at least one said embossing cylinder, a regulator of the embossing pressure being provided between said embossing cylinder and the respective said pressure cylinder, as a function of the temperature of said embossing cylinder or of the thermal expansion of said embossing cylinder.

In accordance with a 32nd aspect, the invention relates to an embossing machine according to the above-mentioned 31st aspect, wherein said regulator of the embossing pressure comprises a device for moving said pressure cylinder and respective embossing cylinder toward or away from each other.

In accordance with a 33rd aspect, the invention relates to an embossing machine according to the above-mentioned 31st or 32nd aspect, wherein at least one pressure sensor is associated with said regulator of the pressure between said embossing cylinder and a respective said pressure cylinder, so that a variation of the pressure during the embossing step causes said pressure cylinder to move toward or away from the respective embossing cylinder, preferably in order to maintain the embossing pressure constant.

In accordance with a 34th aspect, the invention relates to an embossing machine according to one or more of the preceding aspects, wherein said laminating device is provided with a pressing member defining a laminating nip with one said embossing cylinder with which said heating device is associated, a device for regulating the laminating pressure being provided between said embossing cylinder and said pressing member, as a function of the temperature of said embossing cylinder or of the thermal expansion of said embossing cylinder.

In accordance with a 35th aspect, the invention relates to an embossing machine according to the above-mentioned 34th aspect, wherein said device for regulating the laminating pressure comprises a device for moving said pressing member and said embossing cylinder toward or away from each other.

In accordance with a 36th aspect, the invention relates to an embossing machine according to the above-mentioned 34th or 35th aspect, wherein at least one device for evaluating the pressure between said embossing cylinder and said pressing member is associated with said device for regulating the laminating pressure, so that a variation of the pressure during the lamination step causes a movement of said pressing member toward or away from said embossing cylinder, preferably in order to maintain the laminating pressure constant.

In accordance with a 37th aspect, the invention relates to an embossing machine according to one or more of the preceding aspects, which comprises a first of said embossing cylinders and a second of said embossing cylinders defining therebetween said transfer nip, said laminating device being provided with a pressing member defining said laminating nip with said first embossing cylinder, the plies exiting from said transfer nip moving, in contact with one another, along a common wrap angle section of feed path around said first said embossing cylinder and toward said laminating nip; said first embossing cylinder preferably being arranged above a second said embossing cylinder.

In accordance with a 38th aspect, the invention relates to an embossing machine according to the above-mentioned 37th aspect, wherein the embossing machine comprises a first of said feed paths for at least one first ply of paper, which comprises at least a first wrap angle end section around said first embossing cylinder up to said transfer nip, a second of said feed paths for at least one second ply of paper, which comprises at least a second wrap angle end section around said second embossing cylinder up to said second said transfer nip, a third section of path, common for said at least one first ply and said at least one second ply, from said transfer nip, in the form of a wrap angle around said first embossing cylinder up to said laminating nip.

In accordance with a 39th aspect, the invention relates to an embossing machine according to the 38th aspect, wherein said first path further comprises a first free section up to a first said pressure cylinder, a subsequent first wrap angle section around said first pressure cylinder that passes through said first said embossing nip, said first end section.

In accordance with a 40th aspect, the invention relates to an embossing machine according to the 38th or the 39th aspect, wherein said first path further comprises a second free section up to a second said pressure cylinder, a subsequent second wrap angle section around said second pressure cylinder that passes through said second said embossing nip, said second end section, In accordance with a 41st aspect, the invention relates to an embossing machine according to the 38th or the 40th aspect, wherein said first path further comprises a first free section up to a first said embossing cylinder, a subsequent first preferably wrap angle section around said first embossing cylinder that passes through said first embossing nip, said first end section.

In accordance with a 42nd aspect, the invention relates to an embossing machine according to the 38th, 39th or 41st aspect, wherein said first path further comprises a second free section up to a second said embossing cylinder, a subsequent second preferably wrap angle section around said second embossing cylinder that passes through said second embossing nip, said second end section.

In accordance with a 43rd aspect, the invention relates to an embossing machine according to the 38th, 40th or 42nd aspect, wherein said first path comprises a first free section up to a first said embossing cylinder and said first end section, without passing through any embossing nip.

In accordance with a 44th aspect, the invention relates to an embossing machine according to the 38th, 39th, 41st or 42nd aspect, wherein said second path comprises a second free section up to a second said embossing cylinder and said second end section, without passing through any embossing nip.

In accordance with a 45th aspect, the invention relates to an embossing machine according to one or more of the preceding aspects, comprising a cooling system for the at least one said embossing cylinder with which the at least one said heating device is associated, adapted to act to cool the at least one said embossing cylinder during machine stoppages.

In accordance with a 46th aspect, the invention relates to an embossing machine according to the 45th aspect, wherein said cooling system comprises at least one device for emitting cooling toward said at least one embossing cylinder to be cooled.

In accordance with a 47th aspect, the invention relates to an embossing machine according to the 46th aspect, wherein said cooling device is of the air blade type.

In accordance with a 48th aspect, the invention relates to an embossing machine according to the 46th aspect, wherein said cooling device is of the vortex tube type.

In accordance with a 49th aspect, the invention relates to an embossing machine according to the 45th aspect, wherein said cooling system comprises a device for distributing cooling liquid, internally to said at least one embossing cylinder.

In accordance with a 50th aspect, the invention relates to an embossing machine according to one or more of the preceding aspects, wherein said at least one heating device comprises at least one electromagnetic induction device associated externally with said first and/or second embossing cylinder to heat its outer surface, said electromagnetic induction device being connected to a generator device to supply said electromagnetic induction device with electromagnetic induction currents adapted to generate an electromagnetic flow directed toward said first and/or second embossing cylinder and wherein the operating frequency of said electromagnetic induction currents is such as to generate eddy currents on said first and/or second embossing cylinder such as to follow prevalently the profile of the outer surface of said first and/or second embossing cylinder.

In accordance with a 51st aspect, the invention relates to an embossing machine according to the 50th aspect, wherein said eddy currents follow only or prevalently said protrusions on said first and/or said second embossing cylinder.

In accordance with a 52nd aspect, the invention relates to an embossing machine according to the 50th or 51st aspect, wherein said operating frequency of said electromagnetic induction current ranges from 500 Hz to 100 kHz, preferably from 1 kHz to 100 kHz, even more preferably from 5 kHz to 100 kHz, more preferably from 10 kHz to 60 KHz.

In accordance with a 53rd aspect, the invention relates to an embossing machine according to the 50th, 51st or 52nd aspect, wherein said eddy currents are such as to have a minimum value of power density equal to at least 30% of the maximum value of power density, said minimum value being detected within a thickness measured starting from the outer surface of said first and/or second embossing cylinder, equal to at least 0.6 mm, preferably at least 0.4 mm.

In accordance with a 54th aspect, the invention relates to an embossing machine according to one or more of the above-mentioned 50th to 53rd aspects, which comprises at least one temperature sensor adapted to detect the temperature of said first and/or second embossing cylinder with which said at least one first electromagnetic induction device is associated, and wherein said generator is controlled by a central control unit as a function of the temperature detected by said first temperature sensor varying said operating frequency and/or the intensity of said electromagnetic induction currents; preferably the temperature detected by said at least one temperature sensor is the temperature of the outer surface of said first and/or second embossing cylinder.

In accordance with a 55th aspect, the invention relates to an embossing machine according to one or more of the above-mentioned 50th to 54th aspects, wherein said at least one electromagnetic induction device is associated with a handling device to be moved from an operating area adjacent and close to a respective embossing cylinder to be heated to a non-operating area at a distance from said embossing cylinder.

In accordance with a 56th aspect, the invention relates to an embossing machine according to the above-mentioned 55th aspect, wherein said operating area is equal to a distance comprised between 1 mm and 10 mm, preferably between 2 mm and 6 mm.

In accordance with a 57th aspect, the invention relates to an embossing machine according to one or more of the above-mentioned 50th to 56th aspects, wherein said electromagnetic induction device is longitudinally side by side with said at least one embossing cylinder and has a length equal to the axial length of said embossing cylinder.

According to another aspect as one or more of the other aspects described, the embossing machine further comprises at least one steam distributor arranged along a said feed path of at least one ply in said machine, adapted to distribute steam on said at least one ply, in order to carry out a treatment of the ply. In fact, in addition to facilitating ply-bonding, the steam carries out a treatment that improves both the volume of the final product, and the strength of the plies. The presence of one or more steam distributors is preferred in combination with other distributors of material to facilitate ply-bonding, especially of water based type, as described above, in order to transfer moisture to the plies to promote their adhesion.

According to a further aspect, identified as 58th, the invention relates to a method for embossing plies of paper which comprises the following steps

- providing at least one pair of embossing nips for plies of paper,
- providing at least one laminating nip to bond said plies of paper,
- providing at least two feed paths for plies of paper toward said laminating nip,
- providing a pair of embossing cylinders, each having on its surface a respective plurality of embossing protrusions, each defining a section of one said path for at least one said ply in the form of a wrap angle for said at least one ply of paper, and defining therebetween a transfer nip for plies of paper,
- providing a pair of pressure cylinders, each side by side with a respective said embossing cylinder, said embossing nip being defined between each pair formed of embossing cylinder and pressure cylinder,
- providing a laminating device for the assembly of plies delivered from said transfer nip, to bond said plies,
- providing at least one distribution device of material to facilitate ply-bonding arranged along a said path of at least one ply upstream of said laminating device
- providing at least one heating device for at least one of said embossing cylinders,
- passing at least one first ply through said first embossing nip,
- passing at least one second ply through said second embossing nip
- heating said at least one first ply and/or said at least one second ply while it passes along the section between said embossing nip and said transfer nip,
- passing said at least one first ply and said at least one second ply through said transfer nip,
- laminating said at least one first ply and said at least one second ply to form a consolidated paper web product.

In accordance with a 59th aspect, the invention relates to a method according to the above-mentioned 58th aspect, wherein the heating of said at least one first ply and/or of said at least one second ply takes place through the transfer of heat by the respective embossing cylinder on which it is partially wound.

In accordance with a 60th aspect, the invention relates to a method according to the above-mentioned 59th aspect, wherein at least the embossing protrusions of said embossing cylinder on which said at least one first ply and/or said at least one second ply is wound are heated, said heating taking place from the inside of the cylinder, or from the outside thereof.

In accordance with a 61st aspect, the invention relates to a method according to the above-mentioned 60th aspect, wherein said heating of the embossing cylinder takes place by Joule effect through eddy currents circulating on the surface of the embossing cylinder, electromagnetically induced by an electromagnetic inductor facing the surface, preferably the method comprising a step of varying the induction frequency to vary the surface depth on which to induce the eddy currents.

In accordance with a 62nd aspect, the invention relates to a method according to one of the aspects described above, wherein said at least one first ply and/or said at least one second ply is wound on the respective heated embossing cylinder, for a wrap angle with an angle comprised between 15° and 345°, and more preferably between 30° and 330°; preferably a step of varying said angle being provided.

In accordance with a 63rd aspect, the invention relates to a method according to one of the aspects described above, which comprises a distribution step, before the lamination step, of at least one fluid product on said at least one first ply and at least one second ply, in order to make said at least one first ply and at least one second ply adhere, said product preferably being glue and/or adhesive.

In accordance with a 64th aspect, the invention relates to a method according to the above-mentioned 63rd aspect, wherein said product is water based glue, said method including a step of diluting said glue before its distribution, based on the temperature of at least one embossing cylinder, according to the logic whereby the hotter said cylinder is, the greater the dilution will be.

In accordance with a 65th aspect, the invention relates to a method according to one of the above-mentioned aspects, wherein steam is distributed on at least one said ply along at least one said feed path.

In accordance with a 66th aspect, the invention relates to a method according to the above-mentioned 65th aspect, wherein lamination is followed by a step of measuring the moisture of the web formed by said at least one first and at least one second ply and, if necessary of reducing the amount of steam distributed on the at least first and/or second ply if said measurement gives a value exceeding a threshold value.

In accordance with a 67th aspect, the invention relates to a method according to one of the above-mentioned aspects, wherein the embossing step takes place at an approximately constant pressure, and comprising a step of checking the pressure between said first or second heated embossing cylinder and the respective pressure cylinder, and, if necessary, a step of varying the pressure between said first or second heated embossing cylinder and the respective pressure cylinder in the case in which the pressure measured deviates significantly from the approximately constant embossing pressure.

In accordance with a 68th aspect, the invention relates to a method according to one of the above-mentioned aspects, comprising a step of moving said at least one first ply of paper moving along said at least one first path, said step comprising at least

- following a first wrap angle end section around said first embossing cylinder up to said transfer nip,
- following a second of said feed paths for at least one second ply of paper, which comprises
  - following at least one second wrap angle end section around said second embossing cylinder up to said second transfer nip,
  - following a third section of path, common for said at least one first ply and said at least one second ply, from said transfer nip, in the form of a wrap angle around said first embossing cylinder up to said laminating nip.

In accordance with a 69th aspect, the invention relates to a method according to the above mentioned 68th aspect, wherein following said first path further comprises

- following a first free section up to a first said pressure cylinder,
- following a subsequent first wrap angle section around said first pressure cylinder that passes through said first said embossing nip,
- following said first end section.

In accordance with a 70th aspect, the invention relates to a method according to the above-mentioned 68th or 69th aspect, wherein following said second path further comprises

- following a second free section up to a second said pressure cylinder,
- following a subsequent second wrap angle section around said second pressure cylinder that passes through said second said embossing nip,
- following said second end section, In accordance with a 71st aspect, the invention relates to a method according to the above-mentioned 68th or 70th aspect, wherein following said first path further comprises

- following a first free section up to a first said embossing cylinder,
- following a subsequent first preferably wrap angle section around said first embossing cylinder, that passes through said first embossing nip,
- following said first end section.

In accordance with a 72nd aspect, the invention relates to a method according to the above-mentioned 68th, 69th, or 71st aspect, wherein following said second path further comprises

- following a second free section up to a second said embossing cylinder,
- following a subsequent second preferably wrap angle section around said second embossing cylinder, that passes through said second embossing nip,
- following said second end section.

In accordance with a 73rd aspect, the invention relates to a method according to the above-mentioned 68th, 70th, or 71st aspect, wherein following said first path comprises following a first free section up to a first said embossing cylinder and following said first end section, without passing through any embossing nip.

In accordance with a 74th aspect, the invention relates to a method according to the above-mentioned 68th, 69th, 71st or 72nd aspect, wherein following said second path comprises following a second free section up to a second said embossing cylinder and following said second end section, without passing through any embossing nip.

BRIEF DESCRIPTION OF THE DRAWINGS

The invention will be better understood by following the description and the accompanying drawings, which illustrate some non-limiting examples of embodiment of the invention. More in particular, in the drawing.

DETAILED DESCRIPTION OF EMBODIMENTS

Figure 1:
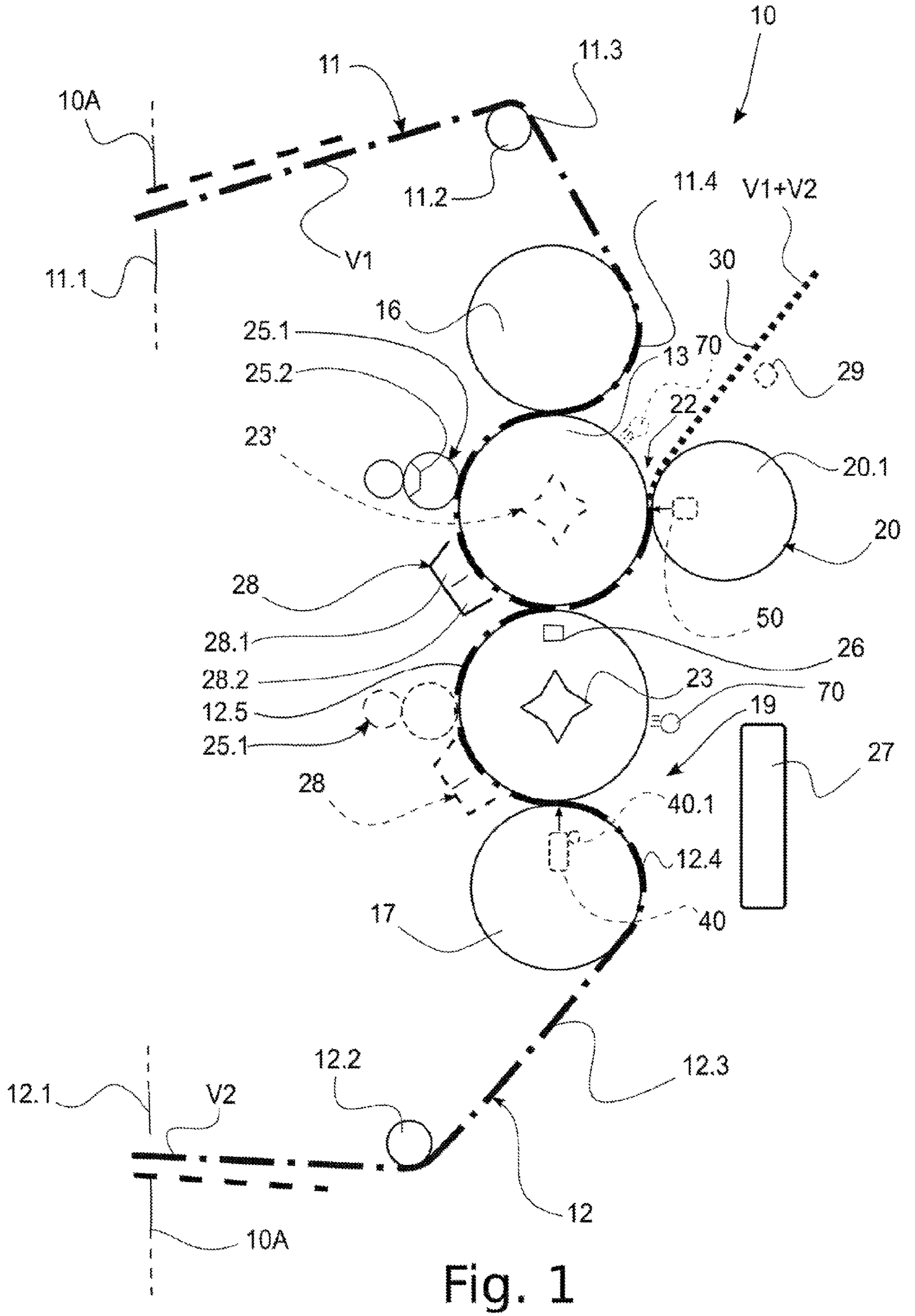
FIG. 1 represents a schematic view of an embossing machine according to the invention.

With reference to the above-mentioned figures, and in particular to FIG. 1, a machine for embossing paper web products with two or more plies of paper web, is indicated as a whole with the number 10. In the figures, the elements highlighted by dashed lines of the dash-dash type are considered optional or alternative to the same elements marked by continuous lines or dashed lines.

For each example, this machine 10 comprises a first feed path 11 for a first ply of paper V1, and a second feed path 12 for a second ply of paper V2, both paths extending, for example, from a respective entrance to the machine 11.1 and 12.1, such as an opening in a casing 10A that surrounds the machine (not shown in its entirety) or more in general a free hanging passage between guide rollers 11.2 and 12.2 or toward a laminating nip 22 for ply-bonding V1 and V2, better described below.

A first embossing cylinder 13 and a second embossing cylinder 14, defining therebetween a transfer nip 15 for plies V1 and V2 are arranged along the first path 11. In particular, in these examples, the first embossing cylinder 13 is positioned above the second embossing cylinder 14. Preferably, the two embossing cylinders are made of metal, for example steel.

Each embossing cylinder comprises embossing protrusions (see FIGS. 2A and 2B), which extend from respective bottom surfaces and are provided with respective embossing tips. In particular, the first embossing cylinder 13 comprises a first bottom surface 13.1, first embossing protrusions 13.2, which have first embossing tips 13.3. Similarly, the second embossing cylinder 14 comprises a second bottom surface 14.1, second embossing protrusions 14.2 and second embossing tips 14.3.

For each embossing cylinder 13-14, the bottom surface 13.1-14.1 of the embossing cylinder is the surface of the cylinder that separates the bases of the embossing protrusions. Generally, this surface 13.1 13.1-14.1 is smooth. In the case of embossing protrusions with two heights, the bottom surface of the embossing cylinder is considered the one that separates the bases of the tips of smaller height.

A respective pressure cylinder is provided along each path 11 and 12 for the plies V1 and V2, respectively a first pressure cylinder 16 arranged in contact with the first embossing cylinder 13 and a second pressure cylinder 17 arranged in contact with the second embossing cylinder 14. Preferably, the two pressure cylinders comprise an outer surface made of elastically yielding material, for example rubber. The two pressure cylinders can be supported by arms or other members (not shown) that allow them to move toward and away from the respective embossing cylinders for the purposes that will be explained below. Actuators (not shown), such as piston-cylinder actuators, can be used to press the pressure cylinders against the respective embossing cylinders.

Respective embossing nips are defined between each embossing cylinder-pressure cylinder pair, through which the plies are permanently deformed ("embossed"), and in particular a first embossing nip 18 between the first embossing cylinder 13 and the first pressure cylinder 16, and a second embossing nip 19 between the second embossing cylinder 14 and the second pressure cylinder 17.

A lamination device 20 of the assembly of plies V1 and V2 delivered from the transfer nip 15, to bond these plies, is facing the first embossing cylinder 13. In particular, this laminating device 20 is provided with a pressing member, for example a laminating cylinder 20.1, defining the laminating nip 22 with the first embossing cylinder 13. In a known manner, the laminating cylinder 20.1 presses the two plies V1 and V2 onto the first embossing cylinder 13 (the thickness of the plies is greater than the distance between two cylinders), obtaining ply-bonding. Ply-bonding can be solely mechanical, i.e., the cellulose fibers of one ply, by reason of the pressure, mutually penetrate the adjacent ply, or partially mechanical and chemical, for example through the at least partially presence of adhesive or by adhesion of moist fibers of one ply to the fibers of the other ply with drying such that the fibers that were wet adhere to the others, and naturally also with the contribution of the pressure of the pressing member of the laminating device 20.

Figure 3A:
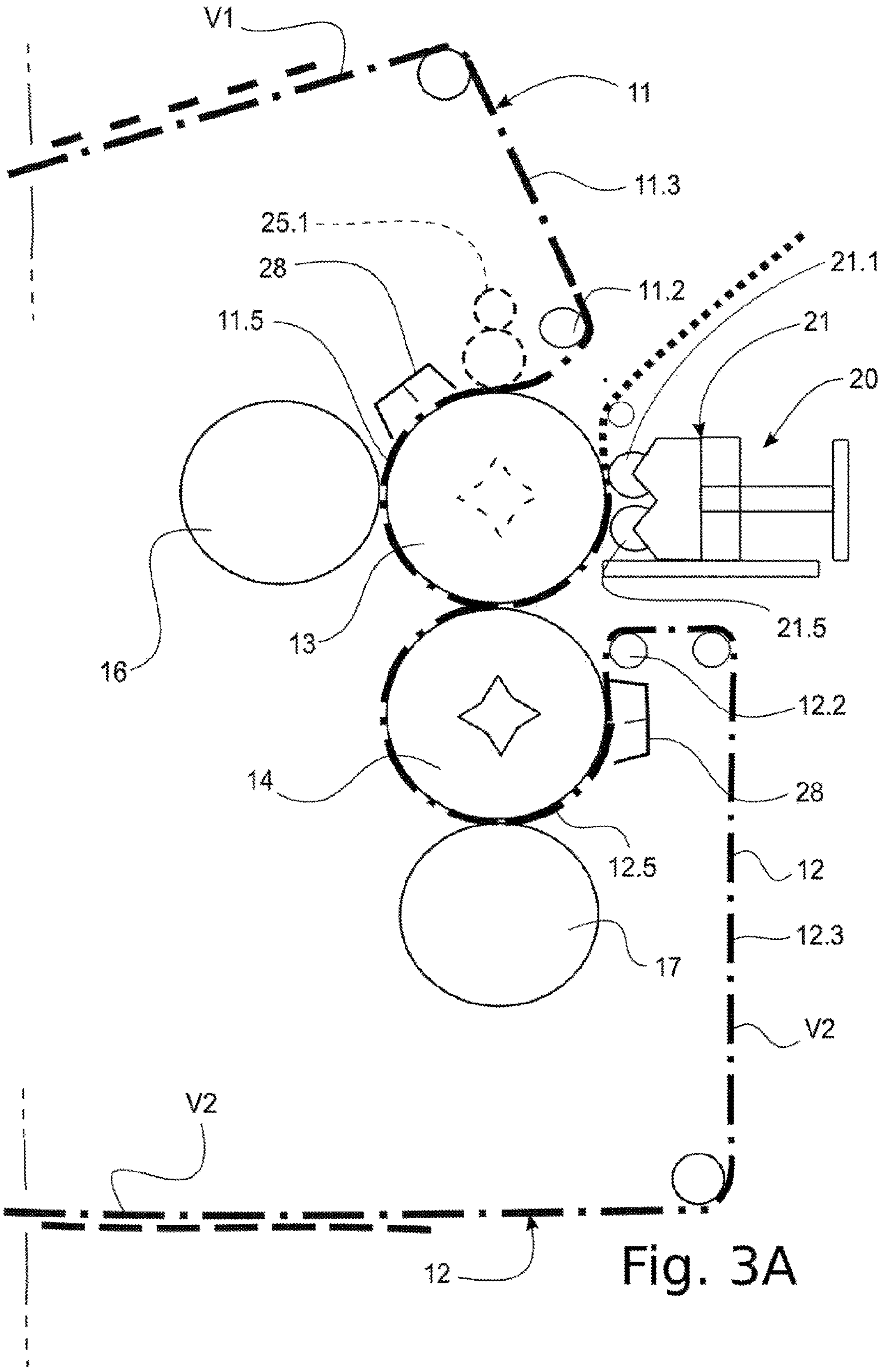
FIG. 3A represents a schematic view of a first variant of the machine of FIG. 2.
Figure 3B:
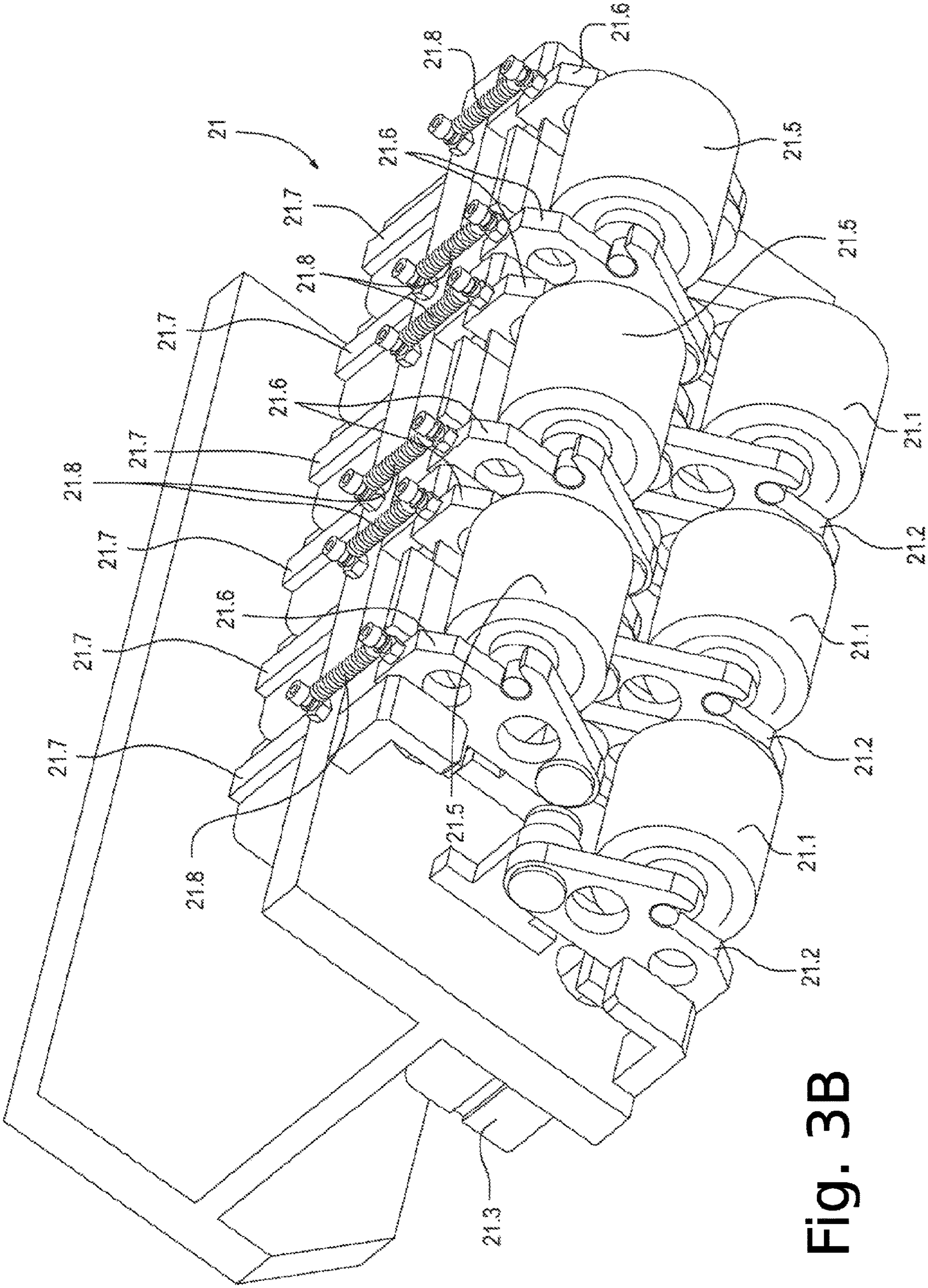
FIG. 3B represents a schematic axonometric view of a laminating device to be used for example in the machine of FIG. 3A.

Alternatively, as shown, for example, in FIG. 3A and in FIG. 3B, in place of a laminating cylinder, the laminating device 20 can comprise a pressing member 21 provided with a first series of small rollers 21.1, which press the plies toward the embossing cylinder. For example, the rollers 21.1 are aligned to be approximately coaxial to one another, mounted to rotate, preferably idle, about the respective common rotation axis. The rollers 21.1 are, for example, spaced from one another along the common rotation axis.

The rollers 21.1 can be supported by arms 21.2, for example oscillating, driven by actuators, for example pneumatic actuators 21.3, so as to press the rollers 21.1 against the tips 13.3 of the embossing protrusions 13.2 of the first embossing cylinder 13. The rollers 21.1 can be supported independently from one another so as to be able to carry out different movements from one another toward the first embossing cylinder 13. This allows, through actuators 21.3 preferably independent from one another, each roller 21.1 to be pressed independently from the others against the approximately cylindrical surface of the first embossing cylinder 13. In this way, any deformations of the first embossing cylinder 13, for example a bending deformation caused by the same pressure exerted by the rollers 21.1, is compensated and each roller 21.1 is pressed correctly against the first embossing cylinder 13. Therefore, substantially the same pressure is exerted between each roller 21.1 and the first embossing cylinder 13, even in the case in which the axis of the first embossing cylinder 13 were to be deformed as a result of the load, or in the case in which the first embossing cylinder 13 were to have a non-cylindrical slightly convex outer surface. As a result of this independent mounting the rollers 21.1 are effectively coaxial only if the surface of the first embossing cylinder 13 is effectively cylindrical. Otherwise, the concentricity of the rollers 21.1 must be understood as approximate.

The pressing member 21 of the laminating device 20 can also comprise a second series of small rollers, preferably aligned to be approximately coaxial 21.5, mounted to rotate, preferably idle, about the respective common rotation axis, approximately parallel to the rotation axis of the first rollers 21.1. The second rollers 21.5 are preferably spaced from one another along the common rotation axis. The rollers 21.5 can be supported by oscillating arms 21.6, driven by actuators, for example pneumatic actuators 21.7, so as to press the rollers 21.5 against the tips of the embossing protrusions 13.2 of the first embossing cylinder 13. Elastic return members 21.8 can tend to move the rollers 21.5 away from the surface of the embossing cylinder 13 against the action of the actuators 21.7. A similar arrangement of elastic return members (not visible in the drawing) can be provided for the rollers 21.1. For the rollers 21.5 the same applies as said for the rollers 21.1 in relation to their ability to compensate differences in the surface of the embossing cylinder 13 relative to a perfectly cylindrical shape. Consequently, also for the rollers 21.5 the coaxial arrangement must be understood as approximate.

Advantageously, the rollers 21.1 and/or 21.5 can be heated by means of a suitable heating device, for example by means of electrical heating elements inserted inside the rollers, or electrical induction or steam systems that heat the surface of the rollers, etc., for example the temperature of the rollers can be comprised between 70° C. and 160° C., preferably between 90° C. and 130° C.

Advantageously, in each example, the machine comprises at least one heating device for at least one of said embossing cylinders. For example, it comprises a heating device 23 for the second embossing cylinder 14. This heating device is indicated in the figures by a star symbol.

Alternatively, the machine comprises a heating device 23' for the first embossing cylinder 13 (in the figures, indicated by the star symbol shown schematically with a dashed line).

Also alternatively, the machine can simultaneously comprise a first and a second heating device 23 and 23' respectively for the first and for the second embossing cylinder 13 and 14.

The indication of the star symbol inside the embossing cylinder is purely indicative and this indication is meant simply as the association of the heating device with the respective cylinder. The heating devices 23 (23') can be devices that heat the respective cylinders from the inside, or from the outside, as better explained below.

Advantageously, the machine comprises at least one distribution device of material to facilitate ply-bonding arranged along a section of the first of the second path 11 and 12.

For example, this distribution device of material to facilitate ply-bonding comprises a fluid adhesive material distributor 25.1 of known type, for example arranged close to the first embossing cylinder 13, at the wrap angle section 11.5 of the first ply V1 on the first embossing cylinder 13 for the distribution of adhesive material on the ply of paper moving along said wrap angle 11.5.

A known system (not indicated in the figures for simplicity) to distribute the water based fluid adhesive can have a reservoir from which the fluid is taken up by a ceramic anilox roller (with cells that collect the fluid) over which a doctor blade that scrapes the outer surface of the anilox roller passes. The anilox roller is in contact with a distributing roller (cliché roller), generally made of elastic material, to which it transfers the fluid that is subsequently transferred to the paper on the embossing cylinder. The cliché roller operates in contact with the paper, so that by varying the operating pressure between cliché roller and paper, the amount of fluid transferred is increased.

Preferably, the distribution device of material to facilitate ply-bonding is a water based fluid distributor, i.e., the material to facilitate ply-bonding is water based, so that the distribution device of material to facilitate ply-bonding, by means of distribution of the material to facilitate ply-bonding on the ply of paper transferred along the wrap angle 11.5, is adapted to transfer moisture to that ply to promote ply-bonding.

Therefore, a system (not shown in the figures) to control the amount of moisture that can be transferred from the distribution device of water based material to facilitate ply-bonding to the ply can be associated with the distribution device of material to facilitate ply-bonding.

In the case of distribution of fluid adhesive material, advantageously the fluid adhesive material distributor 25.1 relates to a water based adhesive or glue and the system to control the amount of moisture that can be transferred comprises, for example, a dilution device 25.2 of the fluid adhesive material to be distributed, correlated with the heating carried out by the heating device 23 (23'), such that the dilution of said fluid adhesive material increases as the heating carried out by said device increases. In some examples, a temperature sensor 26 (sensor on the heated cylinder) associated with the control unit 27 of the machine (the control unit can be a PLC, an industrial computer, a microprocessor, a network of computers or any other similar known device), can be provided on the second embossing cylinder 14, so that when the temperature detected by the temperature sensor 26 increases, the fluid adhesive material being distributed is diluted.

The degree of moisture transferred to the ply of paper can be a function of the temperature of the cylinder, as described above, or, preferably, of the feed speed of the plies in the machine. In fact, the more slowly the machine rotates the longer the paper remains on the heated cylinder and the more heat it absorbs, drying the water based fluid and therefore being unable to bond the plies. The more water there is in the material to facilitate ply-bonding, the truer this is.

Therefore, the system to control the amount of moisture that can be transferred can be a function of the feed speed of the ply on which the material to facilitate ply-bonding is distributed along the path, so that when the speed is increased the amount of moisture that can be transferred to the ply increases. Advantageously, the system to control the amount of moisture that can be transferred can comprise a regulator of the flow rate or of the pressure of the fluid distributed (not indicated in the figures).

As said, the adhesive material can be a water based glue, and the dilution device 25.2 can comprise a water reservoir, or a water supply system (neither of which is shown in the figures), such that when the temperature of one of the two (or both) embossing cylinders 13 and 14 increases, water is supplied to the fluid adhesive material distributor 25.1, diluting the water based glue. This results in a saving of glue, as the excess water acts as adhesive medium once the plies are bonded and dry. In practice, by heating one or both of the two embossing cylinders 13, 14 it is possible to evaporate a greater amount of water obtaining a multi-ply web that has the same percentage of moisture as the case in which the embossing cylinders are not heated and the adhesive material is less diluted. Moreover, the increase in moisture of the plies increases their autogenous adhesion during the pressure of the pressing member 21, promoting mutual bonding of the cellulose fibers of the two plies V1, V2.

Alternatively, the fluid adhesive material distributor 25.1 can be arranged close to the second embossing cylinder 14, at the wrap angle section 12.5 of the second ply V2 on the second embossing cylinder 14 for the distribution of adhesive material on the ply of paper moving along said wrap angle 12.5, as shown with the dashed line in FIG. 1. In other examples, not illustrated, two fluid adhesive material distributors 25.1 can be provided, arranged close to respective embossing cylinders 13 and 14 (for example, the second is marked by a dashed line in FIG. 1).

The fluid adhesive material distributor 25.1 can be arranged preferably close to an embossing cylinder provided with the heating device 23 (23'). In other embodiments, it can also be arranged close to an embossing cylinder without a heating device.

It is understood that in the case in which more than one layer of plies (for example two) are wound on a respective embossing cylinder 13 or 14, distribution of adhesive takes place on the outermost ply, i.e., the ply that is not in direct contact with the embossing cylinder.

Alternatively or in addition to the fluid adhesive material distributor 25.1, the distribution device of material to facilitate ply-bonding can be, as said, a distributor of water based fluid to distribute a water based solution, or even water, for example containing an additive that increases the boiling point. The positions can be the same as those indicated for the fluid adhesive material distributor 25.1

The fact of distributing a water based fluid allows moisture to be transferred to the ply (or plies). The water acts as adhesive medium once the plies are bonded and dry.

Distribution of water based solution, or of water, on the ply can take place, for example, with a device similar to the one used for distribution of the glue described above (cliché roller), by means of distributor/spray nozzles or yet other distribution systems.

As described above, the degree of moisture transferred to the ply of paper can be a function of the temperature of the cylinder, or, of the feed speed of the plies in the machine. In fact, the more slowly the machine rotates the longer the paper remains on the heated cylinder and the more heat it absorbs, drying the fluid and therefore being unable to bond the plies Alternatively or in addition to the fluid adhesive material distributor 25.1, the distribution device of material to facilitate ply-bonding in the form of water based fluid distributor can comprise at least one steam distributor 28 arranged along a section of one of the feed paths of the plies 11 or 12, adapted to distribute steam on the respective ply.

In fact, steam is able to moisten the plies of paper, which, after lamination, lose their moisture, remaining bonded to one another.

In addition to facilitating ply-bonding, steam carries out a treatment that improves both the volume of the final product, and the strength of the plies. In this case, the presence of one or more steam distributors is preferred in combination with other distributors of water based material on the plies, as described above, in order to transfer moisture to the plies to promote their adhesion.

The temperature of the steam distributed can be comprised between 50° C. and 120° C., more preferably between 70° C. and 120° C., even more preferably comprised between 80° C. and 90° C.

The steam distributor 28 can be arranged along a section of feed path 11 or 12 in which the respective ply (or plies, in the case of more than one superimposed plies following the path) passes hanging free, i.e., without supports (with the exclusion of supports associated with the steam distributor, for example positioned in front of the distributor to adequately guide the ply in front of the distributor), or in any case a section of path external to the pressing or embossing cylinder, i.e., sections of path to reach a pressure cylinder 16/17 or an embossing cylinder 13/14 from the entrance to the machine.

Furthermore, the steam distributor 28 can be facing an embossing cylinder 13/14 or a pressure cylinder 16/17, i.e., arranged along a section of feed path 11 or 12 relative to the winding of the ply on an embossing cylinder 13/14 or a pressure cylinder 16/17. Several steam distributors 28 can be provided, positioned in different sections of the paths as described above. Naturally, each steam distributor 28 is associated with a supply system of fluid to be vaporized (for example the distributor can be supplied directly with water, which is vaporized in the distributor itself, or the distributor can be supplied directly with the steam to be distributed), not shown in the figures for simplicity.

Advantageously, the pressure at which the steam is distributed is approximately atmospheric pressure, or in any case below 2 bar.

The pressure at which the steam is formed, before being distributed, is comprised between 8 bar and 9 bar.

By increasing the amount of steam distributed on the paper, the amount of moisture transferred thereto is increased. To do this, the flow rate of the steam distributor or the pressure of the steam distributed can be increased Therefore, a system (not indicated in the figures) for controlling the amount of moisture that can be transferred from the distributor to the ply, which for example comprises a regulator of the flow rate or of the pressure of the steam distributed, is associated with the steam distributor.

The steam distributor 28 can also comprise a device for drawing off the part of steam not absorbed by the ply (or plies). For example, the steam distributor 28 comprises a steam distributing area 28.1 and an area 28.2 for drawing off unabsorbed steam.

In some examples, a moisture sensor 29 is associated with the steam distributor (or distributors), arranged on the path 30 of the plies (V1+V2, and any other plies present) bonded downstream of the laminating device. This moisture sensor 29 is operatively connected with the unit 27 and is associated with the moisture control system adapted to act on the steam distributor (or distributors) to allow regulation of the amount of steam to be distributed. For example, if the moisture sensor detects an excessive amount of moisture, the steam distributor (or distributors) 28 are controlled to reduce the amount of steam distributed on the ply (or plies). In other cases, the unit 27 can control the increase of the temperature of the embossing cylinders 13/14.

In preferred embodiments, the steam distributor 28 is facing the lower embossing cylinder 14 along the relative ply winding section, or the upper pressure cylinder 16, along the relative ply winding section. In other configurations, two can be present, arranged in both the positions.

As said, a heating device 23 adapted to heat at least the surface of the cylinder, with particular reference to the embossing protrusions, is associated with an embossing cylinder 13/14.

Figure 2A:
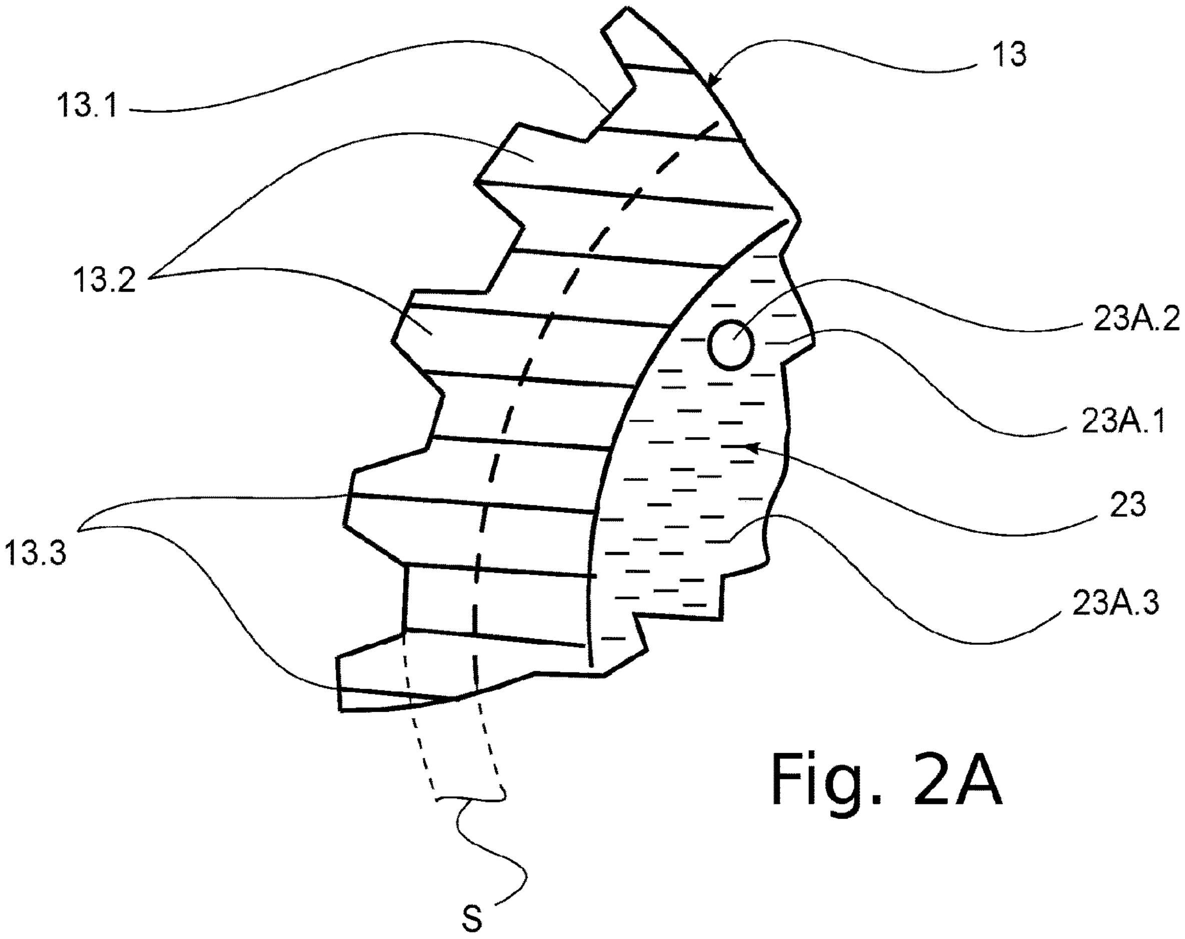
FIG. 2A represents a partially sectional schematic view of a detail of the surface of a first embossing cylinder of a machine according to the invention.
Figure 2B:
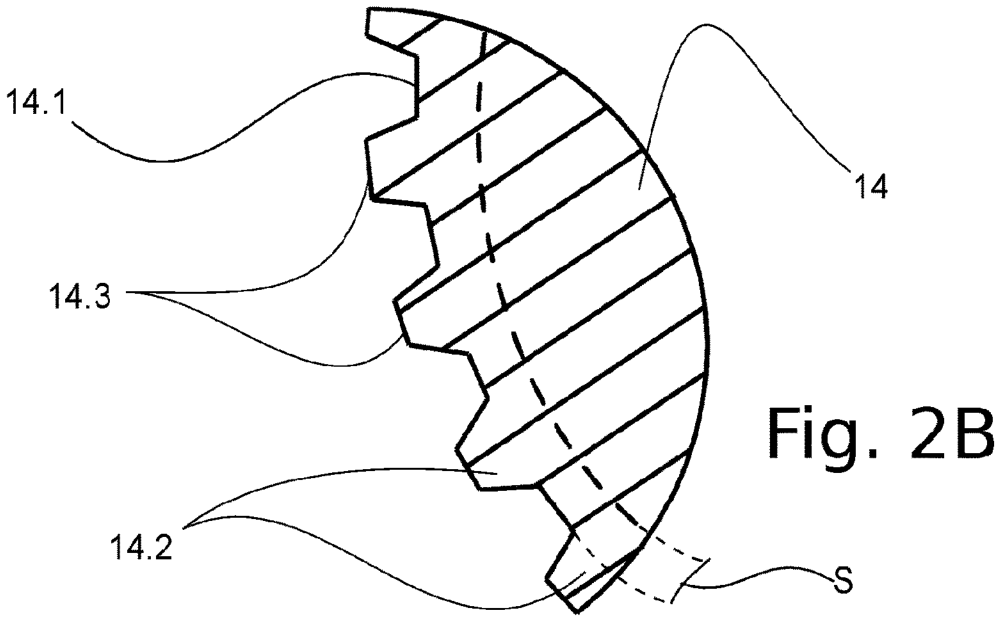
FIG. 2B represents a partially sectional schematic view of a detail of the surface of a second embossing cylinder of a machine according to the invention.

The heating device 23 can, for example, be internal and comprise a gap inside the cylinder into which a heated fluid, such as oil, water, steam or air, is fed (by means of a specific system not shown in the figures). For example, FIG. 2A shows an internal heating device 23A, comprising a gap 23A.1 inside the embossing cylinder, a system 23A.2 for supplying heated diathermic oil 23A.3. Heating from inside can be even on the whole of the surface, naturally reached from the inside, and therefore prevalently by means of thermal conduction through the structure of the cylinder. Alternatively, again from the inside, heating can be implemented by means of one or more electrical heating elements. In this case, these heating elements can be arranged close to the surface of the embossing cylinder.

Advantageously, the operating temperatures of the surface of the heated cylinder are preferably comprised between 70° C. and 160° C., preferably between 90° C. and 140° C.

Differently, the surface of the embossing cylinder 13/14 can be heated from the outside. For example, the heating device 23 can comprise an external heating device facing the surface of the cylinder, without touching it, which transmits heat to the cylinder, for example a halogen lamp device, an electrical heating element device, a flame device (for example supplied by gas), or a heat exchanger device.

Moreover, the external heating device can comprise a device 60 facing the surface of the cylinder of magnetic induction type, i.e., adapted to induce on the surface of the cylinder (which has ferromagnetic material) eddy currents that heat this surface by Joule effect, which will be better described below and illustrated in FIGS. 16 to 19.

As said, the plies of paper wind around the respective embossing cylinders for a given wrap angle. Preferably, for each embossing cylinder 13 and/or 14 with which a heating device 23 (23') is associated, the alpha wrap angle, expressed as angular measurement between the beginning and the end of the section in which the ply (or superimposed plies, in the case of more than one ply) is in contact with the embossing cylinder, is comprised between 15° and 345°, and more preferably between 30° and 330°. This configuration makes it possible to obtain greater heat transfer from the embossing cylinders 13/14 to the plies V1, V2 as the plies are in contact with the respective embossing cylinder for longer relative to the configurations in which the plies wind around the respective rollers with a smaller angle.

A device can be provided for varying the wrap angle on the embossing cylinder 13/14 (not indicated in the figures), for example varying the position of the guide roller that guides the ply (or plies) on the embossing cylinder 13/14 or varying the position of the pressure cylinder relative to the embossing cylinder 13/14 with which it is associated, as better explained below.

Advantageously, a device 40 can be provided for varying the pressure between an embossing cylinder-pressure cylinder pair, for example varying the distance between the two cylinders by means of one or more actuators (only indicated for the second embossing cylinder in the figures, but which can also be provided for the first embossing cylinder), i.e., by implementing a relative movement of the pressure cylinder toward or away from the respective embossing cylinder (or vice versa), preferably in order to maintain the embossing pressure approximately constant. This device 40 is preferably associated with the pressure cylinder/embossing cylinder pair in which the embossing cylinder is associated with the heating device 23. In fact, heating of the embossing cylinder can cause a thermal expansion thereof, reducing the distance in the embossing nip with the pressure cylinder and increasing the relative pressure between the two cylinders, with modification of the physical features of the embossed ply.

A pressure sensor 40.1 adapted to detect the pressure, or the variation of pressure, between the two cylinders can be associated with this device for varying the pressure, such that the machine, based on this detection, is capable of varying the pressure between the cylinders when exceeding a given pressure threshold (for example the pressure must remain approximately constant, i.e., contained within a very limited pressure interval). For example, the axes of the pressing and embossing cylinders are supported by electrical or hydraulic actuators and allow the pressure between the cylinders on the plies: the pressure sensor 40.1 can be formed by one or more load cells arranged on the rods of the aforesaid actuators. Alternatively, the sensor can be a system for detecting the variation of the pressure in the chambers of the hydraulic actuators that support the axes of the cylinders, or also a system of load cells associated with end stops connected with the axes of the cylinders.

The embossing pressure can change as a function of the temperature of the heated embossing cylinder due to thermal expansion. In this case, it is possible to use load cells that measure contact pressure/force between pressure cylinder and embossing cylinder so as to maintain embossing constant by compensating thermal expansion.

Similarly, also a second device 50 for varying the pressure between embossing cylinder-pressure member pair of the laminating device can be associated with the laminating device, for example varying the distance between the cylinder and member by means of one or more actuators, i.e., implementing a relative movement of the pressure member toward or away from the embossing cylinder, preferably in order to maintain the laminating pressure, i.e., the dimensions of the laminating nip, approximately constant. This second device 50 is provided in the case in which the embossing cylinder with which it is associated has a heating device 23', for the same problems linked to the thermal expansion of the cylinder, as explained above. In general, the second device 50 for varying the pressure between the embossing cylinder-pressure member pair is controlled to maintain a pressure constant at a desired level predetermined by the unit 27 or set manually by an operator.

A second pressure sensor adapted to detect the pressure, or the variation of pressure, between the embossing cylinder and pressing member can be associated with this device 50 for varying the pressure, such that the machine, based on this detection, is capable of varying the pressure between cylinder and member when exceeding a given pressure threshold (for example the pressure must remain approximately constant, i.e., contained within a very limited pressure interval). For example, the second pressure sensor can be similar to the one indicated for the device 40.

The machine can comprise a cooling system 70 (for example indicated in FIG. 1) for the embossing cylinders 13, 14 with which the heating device 23 is associated. This cooling system 70 is configured to cool the heated embossing cylinder during machine stoppages, in the case in which the operator requires to work in proximity of the hot embossing cylinder. Access to the machine is only permitted in safe conditions: the rollers must all be stopped, any brakes must be activated and, in the case of hot cylinder, this must not exceed a given temperature.

The cooling system 70 can comprise a device for emitting cooling air toward the embossing cylinder to be cooled, which consists, for example, in a cooling device of the air blade type (i.e., a distributor with a nozzle with elongated slot, which emits an air flow with an elongated, i.e., linear, emission front, preferably at least equal to the axial length of the embossing cylinder to be cooled), or in a cooling device of vortex tube type, also known with the name "Ranque-Hilsch vortex tube".

Operatively, when a machine stoppage occurs such as to require cooling of the heated embossing cylinders 13, 14, the respective pressure cylinder 16,17 and if necessary the laminating device 20 are distanced, i.e., the pressure cylinder is moved away from the surface of the embossing cylinder, if necessary the pull of the paper is loosened slightly and the embossing cylinder is rotated at low speed without the ply of paper wound on the embossing cylinder breaking. In practice, as the paper is no longer pressed on the surface of the embossing cylinder it is free to rub on the embossing cylinder rotating at low speed without breaking. In this way, the whole of the surface of the embossing cylinder comes constantly and repeatedly into contact with the cooling air, obtaining gradual and even cooling of the embossing cylinder 13, 14.

In the case in which the heating device of the embossing cylinder is, for example, internal (as in the case of FIG. 2A), the cooling system comprises a device for distributing cooling liquid, internally to said embossing cylinder, for example by feeding it through the same gap 23A.1.

Some non-limiting examples of possible machine configurations are provided below.

As already said, FIG. 1 shows the case in which a heating device 23 is associated with the second embossing cylinder, i.e., this second cylinder is heated.

The first feed path 11 for the first ply of paper V1 comprises a first free section 11.3 from the entrance 11.1 up to the first pressure cylinder 16, a subsequent first wrap angle section 11.4 around the first pressure cylinder 16 that passes through the first embossing nip 18, and a first wrap angle end section 11.5 around the first embossing cylinder 13 up to the transfer nip 15.

Similarly, the second feed path 12 for the second ply of paper V2 comprises a second free section 12.3 from the entrance 12.1 up to the second pressure cylinder, a subsequent second wrap angle section 12.4 around the second pressure cylinder 17 that passes through the second embossing nip 19, and a second wrap angle end section 12.5 around the second embossing cylinder 14 up to the transfer nip 15.

From here a third section of path 11.12, common for the first ply V1 and the second ply V2, extends in the form of a wrap angle around the first embossing cylinder 13 to reach the laminating nip 22. From here the third path 30 extends, directed toward the outside of the machine or in any case toward further processing operations of the paper web formed by the laminated plies.

The laminating nip 22 is defined between the first embossing cylinder 13 and pressure roller of the laminating device 20.

Figure 4:
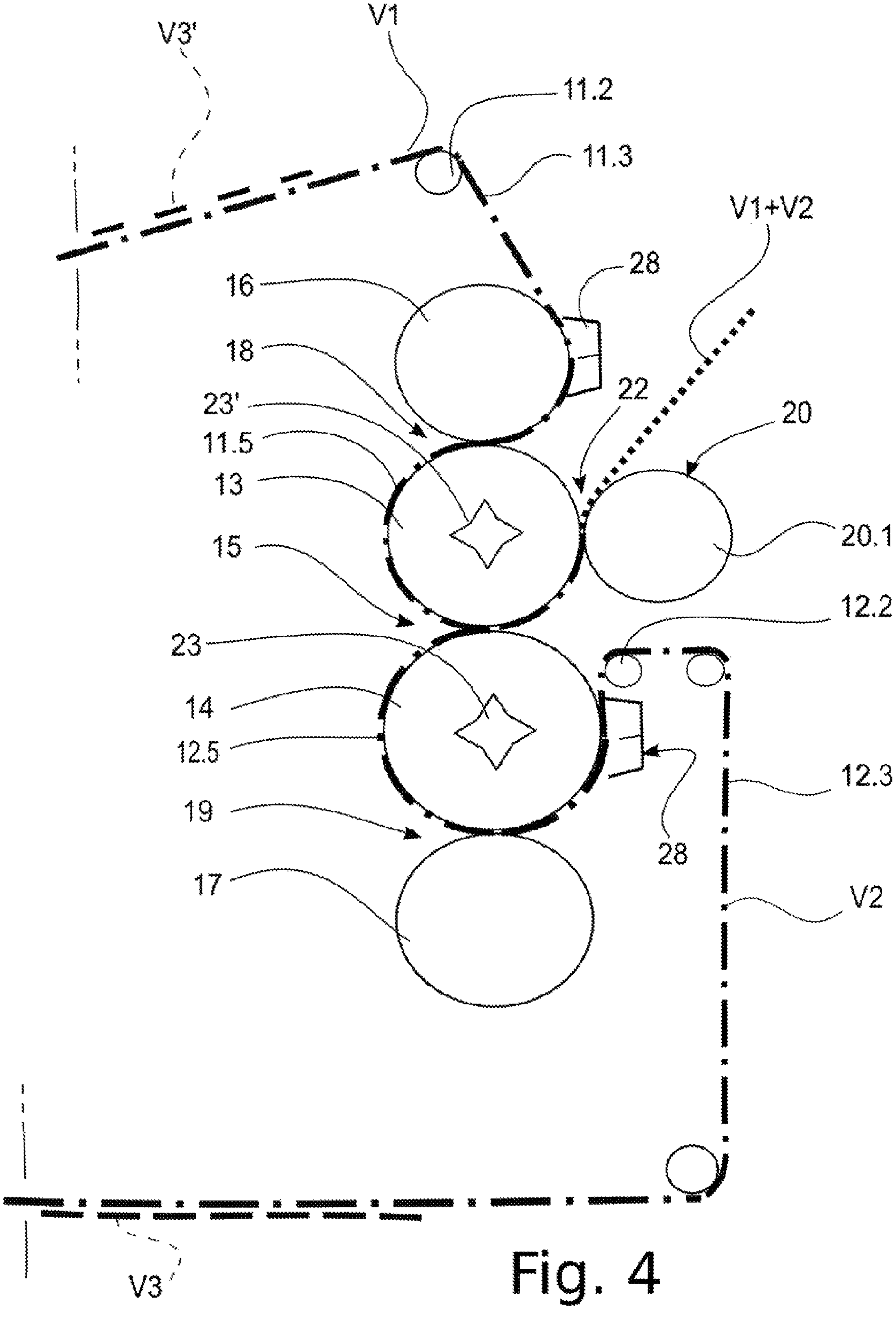
FIGS. 4, 5 and 6 represent further embossing machines, variants relative to those of the preceding figures.

FIG. 4 (and also FIG. 3) shows a variant of the second feed path 12. In this case, the guide roller 12.2 is positioned close to the second embossing cylinder 14 and the second free section 12.3 extends up to the second wrap angle end section 12.5 around the second embossing cylinder 14. Therefore, the second ply V2 is not wound on the second pressure cylinder, interacting therewith only in the second pressure nip. This configuration allows an increase in the wrap angle around the heated cylinder. Advantageously, a device can be provided for varying the position of the second guide roller 12.2, in order to modify the amplitude of the wrap angle around the second embossing cylinder 14.

Figure 5:
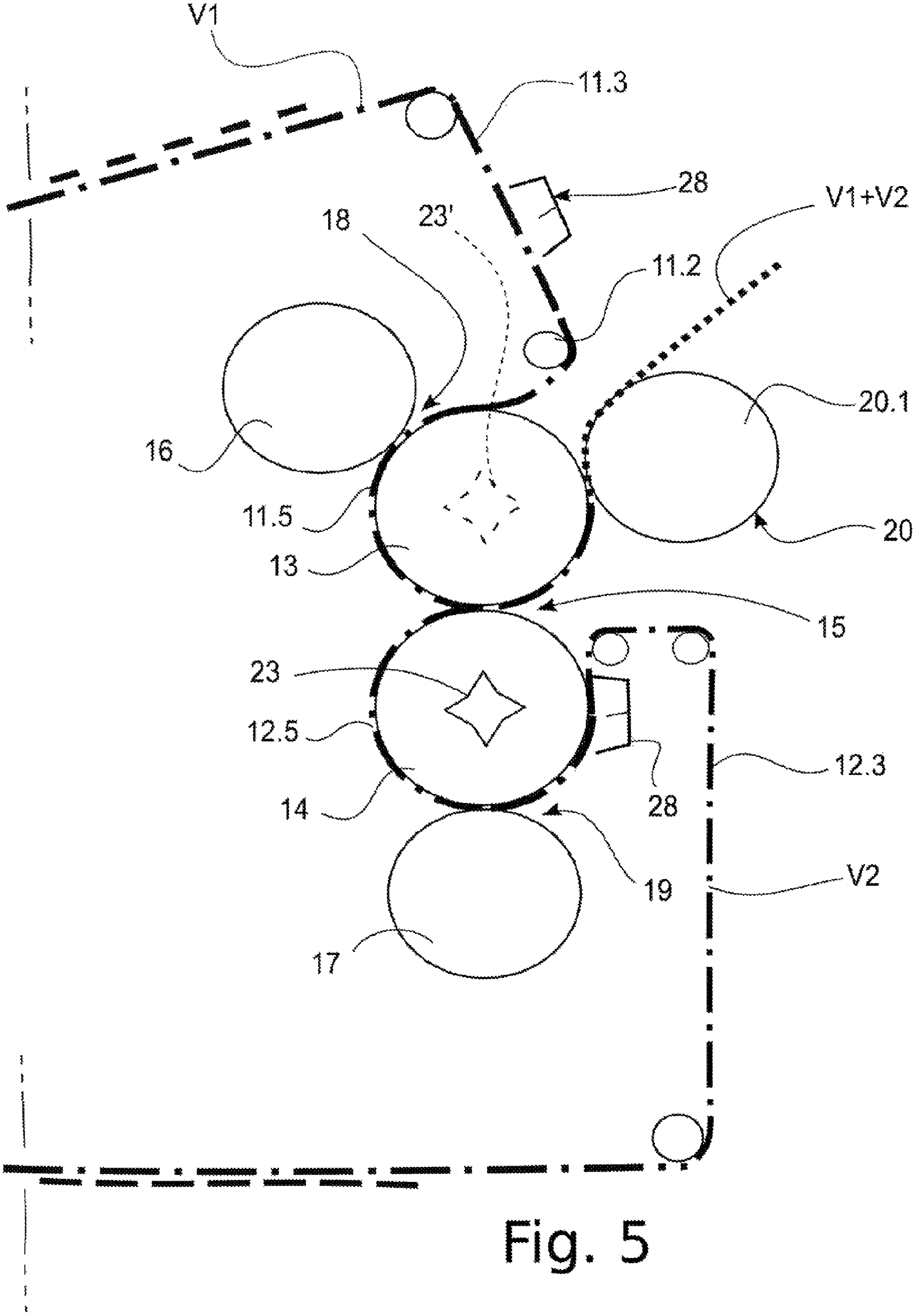

FIG. 5 (and also FIG. 3), also show a variant of the first feed path of the first ply V1, in combination with the variant of the second path illustrated in FIG. 4. Similarly to the example of the above-mentioned FIG. 4, the first path 11 also has the first guide roller 11.2 positioned close to the first embossing cylinder 13 and the first free section 11.3 that extends up to the first wrap angle end section 11.5 around the first embossing cylinder 13. Therefore, the first ply V1 is not wound on the first pressure cylinder, interacting therewith only in the first pressure nip. Advantageously, a device can be provided for varying the position of the first guide roller 11.2, in order to vary the amplitude of the wrap angle around the first embossing cylinder 13. In this case the steam distributor 28 can be positioned either in the first free section 11.3 or on the wrap angle 11.5 around the first embossing cylinder 13.

Figure 6:
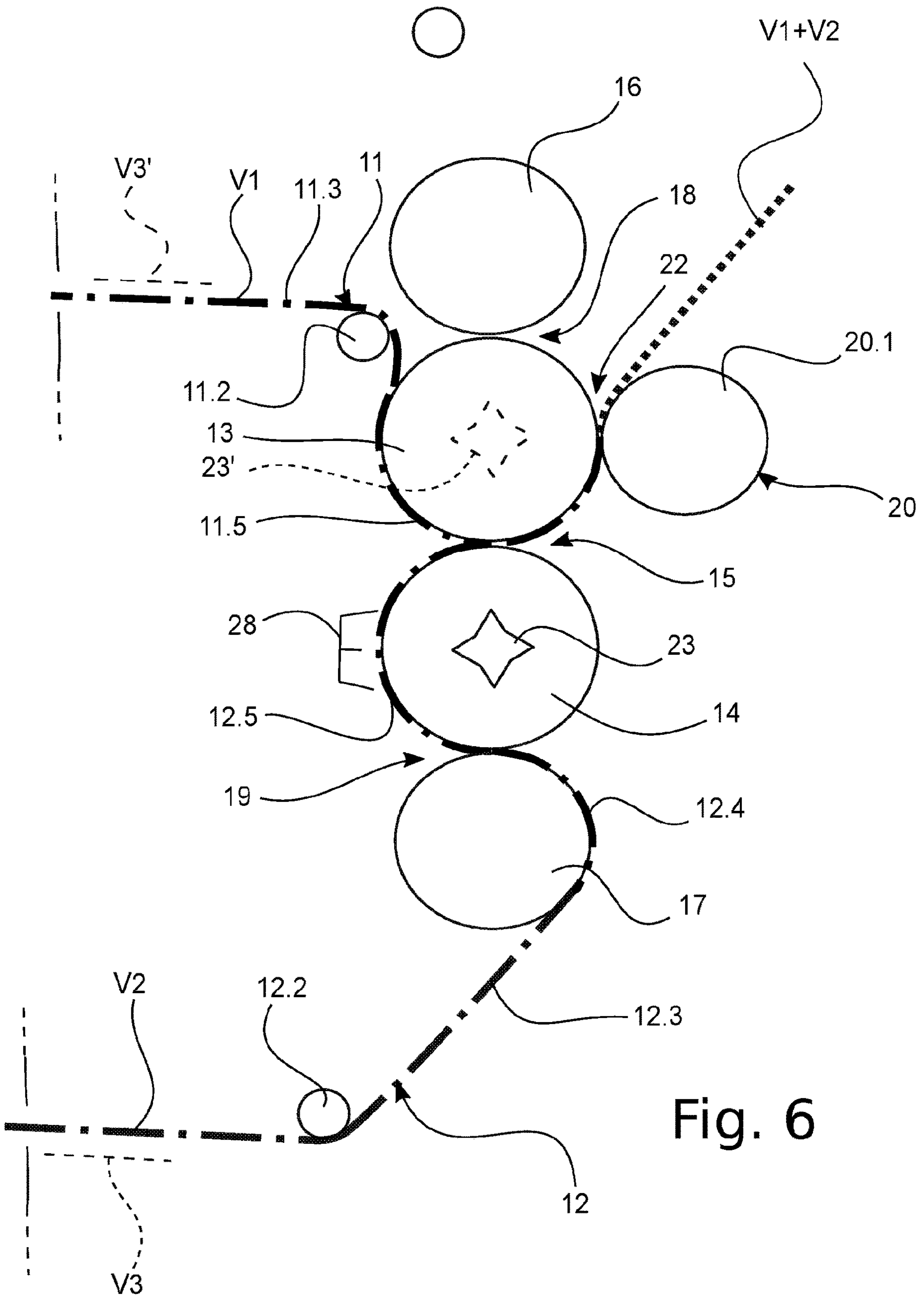

FIG. 6 shows a further variant of the first feed path 11, such that the first pressure roller 18 is excluded from processing and the ply V1 is fed directly to the first embossing cylinder, without passing through the first embossing nip, and therefore this ply is not embossed (being substantially "flat").

In general, the material distribution device 25 comprises, for example, a fluid adhesive material distributor 25.1, arranged facing the first embossing roller 13, at the first wrap angle end section 11.5 around this first embossing cylinder 13.

Alternatively, in place of the fluid adhesive material distributor 25.1, in the same section of path in which this latter is positioned, the steam distributor 28 (indicated with a dashed line in FIG. 1) can be provided. As said, in some embodiments, both the fluid adhesive material distributor 25.1, and the steam distributor 28 (as in FIG. 1) can be provided in this section of path.

Figure 7A:
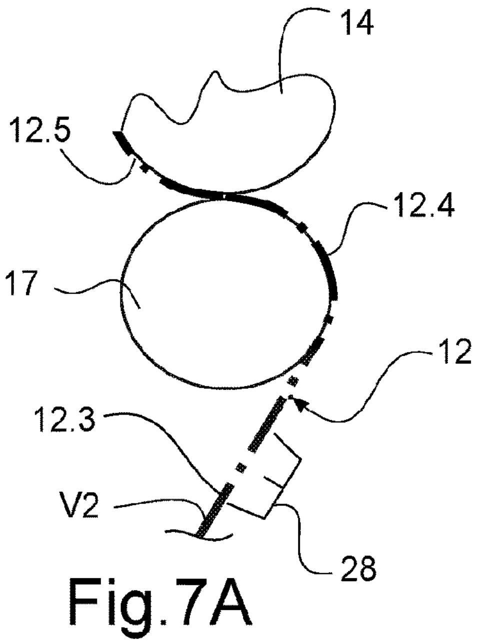
FIGS. 7A, 7B, 7C, 8A, 8B, 8C, 9 and 10 represent some examples of positioning of a steam distributor in an embossing machine according to the invention.
Figure 7B:
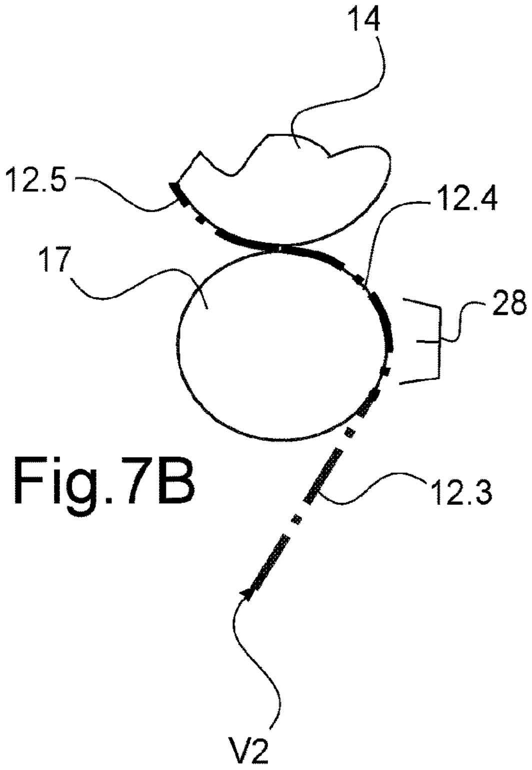
Figure 7C:
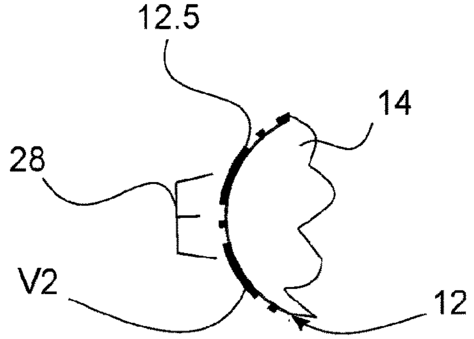

In other non-limiting examples (in some cases already illustrated in the figures of the preceding cases) of positioning of the steam distributor 28, this distributor is, for example, arranged facing the second free section 12.3 (FIG. 7A), or facing the second wrap angle section 12.4 around the second pressure cylinder (FIG. 7B), or facing the second wrap angle end section 12.5 around the second embossing cylinder 14 (FIG. 7C).

Figure 8A:
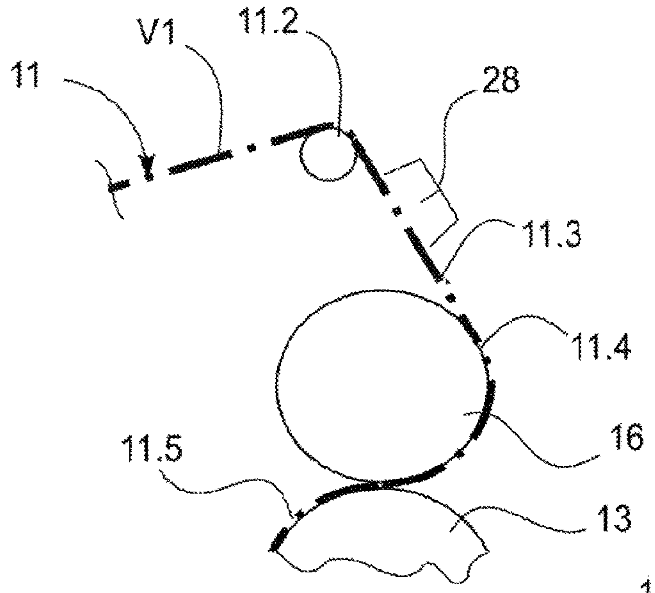
Figure 8B:
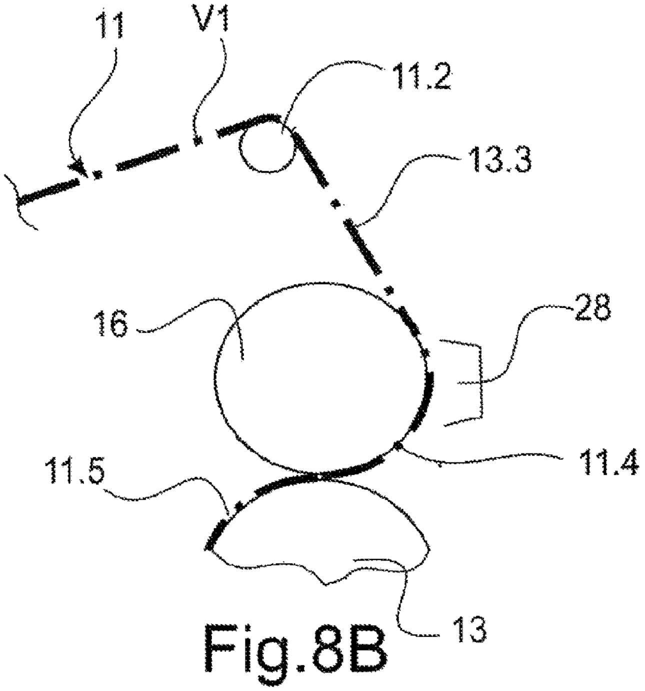
Figure 8C:
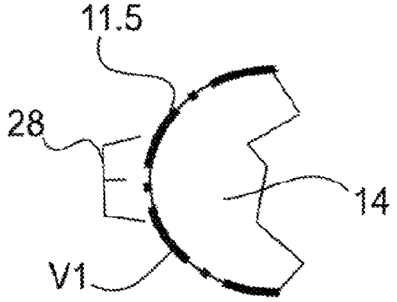
Figure 9:
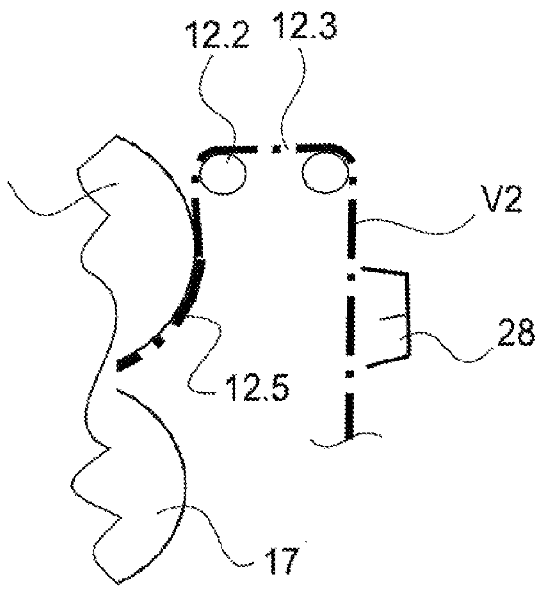
Figure 10:
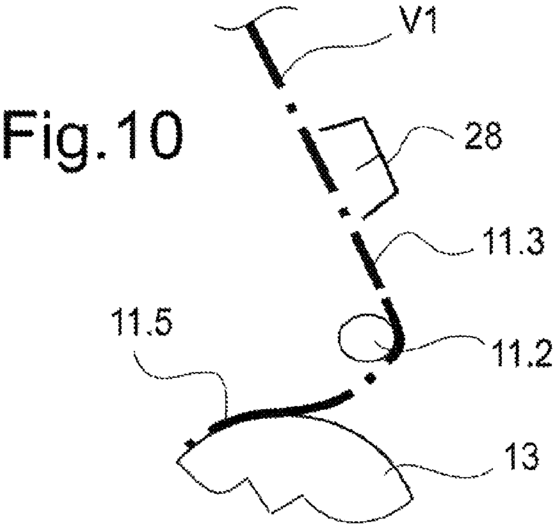

In yet other examples, the steam distributor can be provided in a point of the first feed path 11 (for example, in positions analogous and corresponding to those described above for the second path 12, as in FIGS. 8A, 8B, 8C). Moreover, other examples can include a steam distributor as shown in FIG. 9, or FIG. 10. Moreover, in other examples not shown in the figures, two steam distributors can be provided, each positioned along a respective first and second feed path 11 and 12, for example in one of the positions described above (in practice, combinations of FIGS. 7, 8, 9 and 10).

The use of steam distributors 28 on the plies V1, V2 allows the right amount of moisture to be delivered to the plies so as to increase the advantages due to hot embossing. In particular, the moistened cellulose fibers are more easily shaped by the embossing pressure, or rather moistening of the plies promotes the plastic deformation of the cellulose plies. The heat delivered by the embossing cylinders 13/14 subsequently stabilizes the plastic deformation. In the case in which the steam distributor 28 is used alternatively to, or together with, the material distribution device 25, ply-bonding V1, V2 is greatly facilitated due to the improved autogenous adhesion or bonding between the cellulose fibers of the plies in the case of ply-bonding by pressure or the improved efficacy of the adhesive material due to the greater mutual penetration into the thickness of the plies in the case of use of fluid adhesive material. Moreover, as described below, in the case in which more than one ply is fed along the feed paths 11, 12, the use of the steam distributor 28 improves the autogenous adhesion of the two or more superimposed plies that move at least partially along a common section before passing through the transfer nip 15.

The examples described above, provided with the heating device 23 associated with the second embossing cylinder, can also be provided when this device is only associated with the first embossing cylinder 13 (this option is provided for indicating the device 23' with a dashed line).

In yet other configurations, all the examples described above must be considered valid also in the case of both the embossing cylinders associated with a respective heating device 23 and 23' (i.e., both the embossing cylinders heated). For example, FIG. 4 shows the case of both the embossing cylinders heated, as does FIG. 11.

In general, all the examples described above can have, as said, more than two plies being processed in the machine. For example, a further ply can be superimposed on the respective ply both along the first feed path 11, and along the second feed path 12. Therefore, for example, a third ply V3 can be superimposed on the second ply V2. In the figures this possibility is shown by identifying the ply V3 with a "dash-dot" line and is indicated only in the initial part of the second path 12, meaning that, if provided, this is paired with the second ply V2. Therefore, in the figures, the presence of the dash-dot line and the indication V3, means that the presence of this ply is optional, it being understood that the machine is adapted to process two plies (V1 and V2) or three plies (V1, V2 and V3). The same applies for an optional third (or even fourth) ply V3' associated with the first feed path 11.

Figure 11:
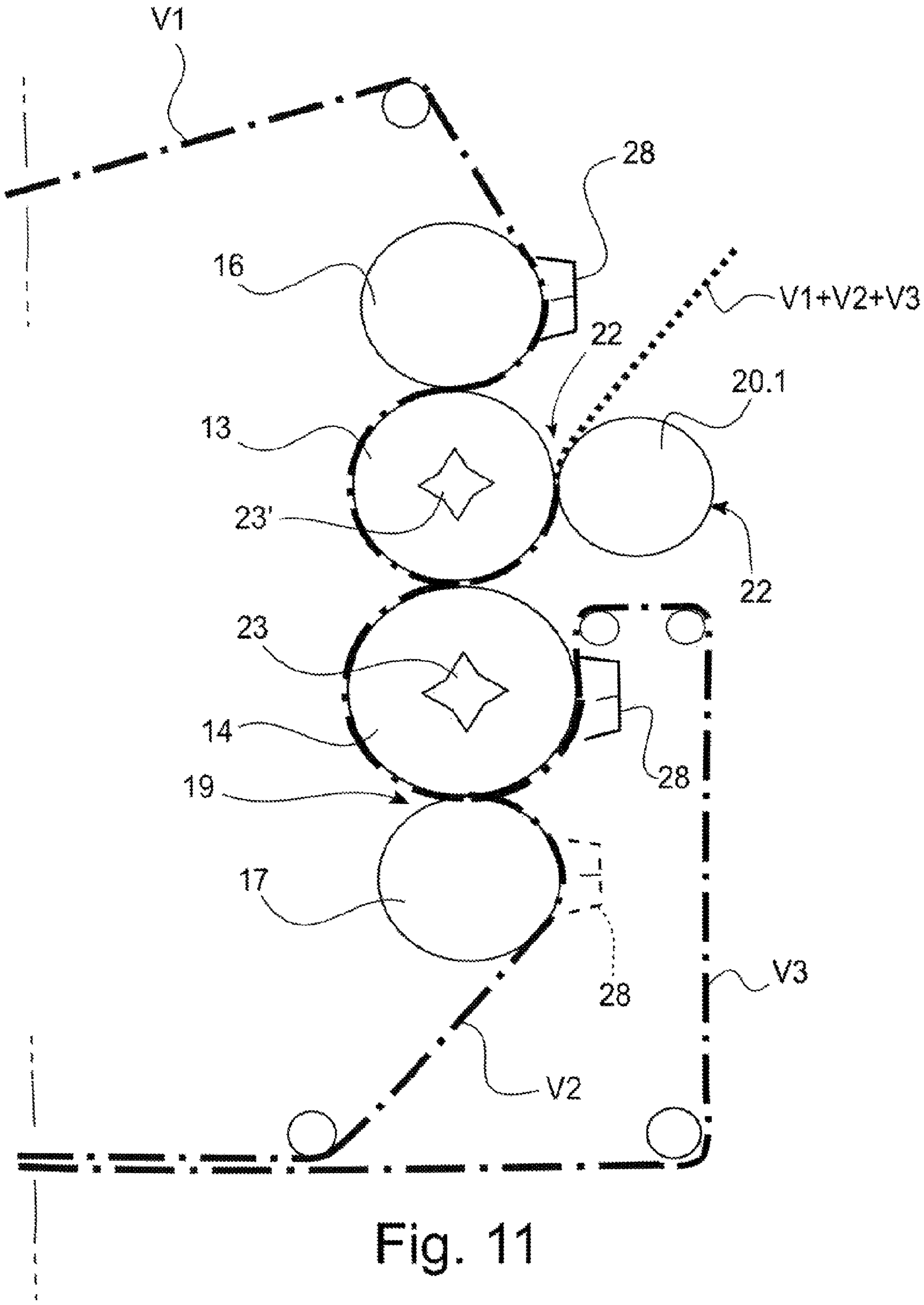
FIGS. 11 to 16 represent further embossing machines, variants relative to those of the preceding figures, expressly showing the case of ply-bonding of at least three plies of paper.

FIG. 11 shows the case in which a second differentiated feed path is provided for the ply V3 relative to the path of the second ply V2. In practice, the second ply V2 follows the feed path of the example of FIG. 1, i.e., it has a wrap angle on the second pressure cylinder 17, while the ply V3 follows the case of the example of FIG. 4, i.e., it does not have a wrap angle on the second pressure cylinder, but directly on the second embossing cylinder 14, after the free section, so that V2 and V3 are superimposed in the second embossing nip 19.

In these cases, for example, one or two steam distributors 28 are provided positioned, for example, in the positions indicated in the figures, as moreover already indicated above.

Figure 12:
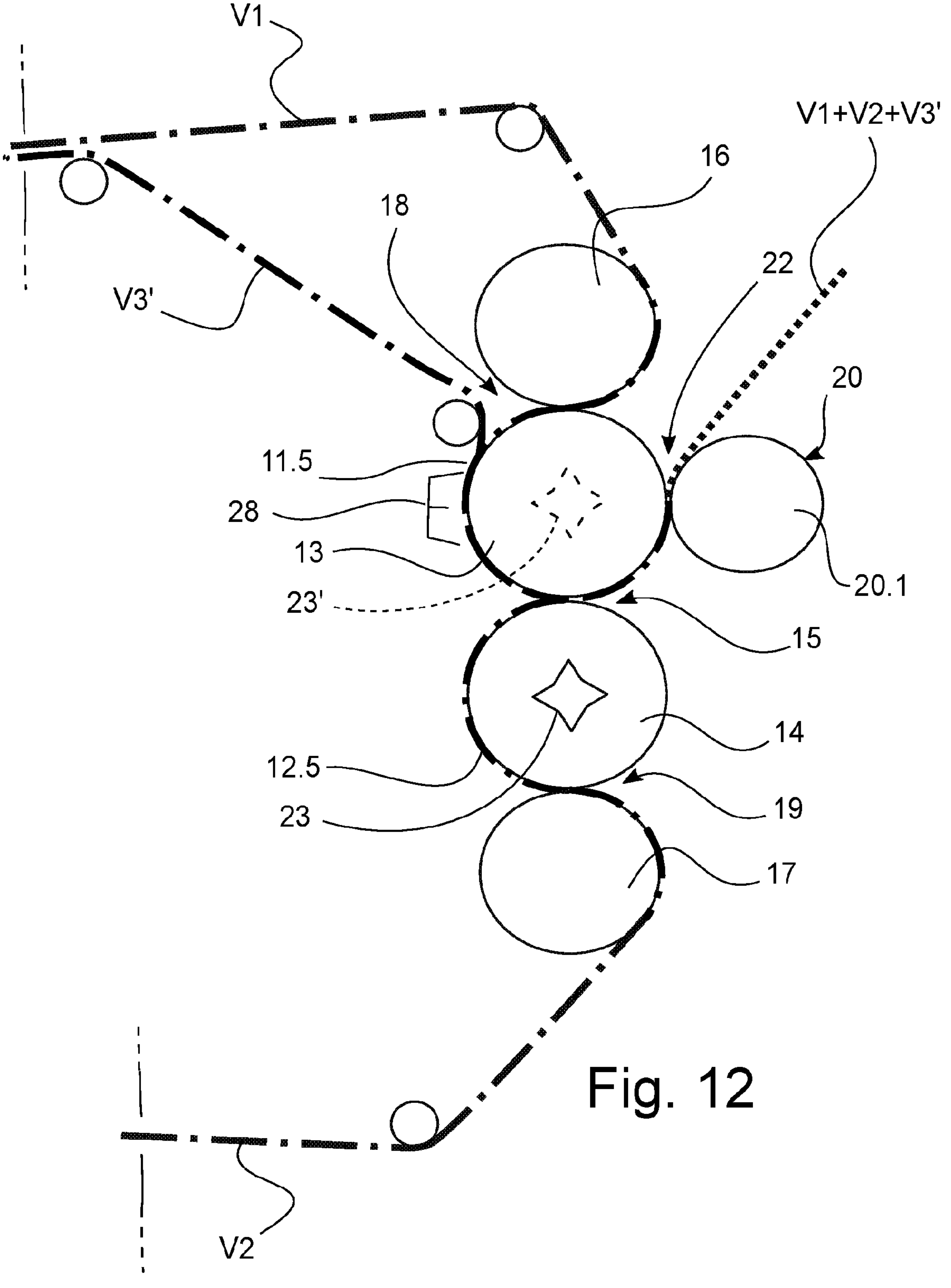

Similarly, FIG. 12 shows the case in which a first differentiated feed path is provided for the ply V3' relative to the path of the first ply V1. In practice, the first ply V1 follows the feed path of the example of FIG. 1, i.e., it has a wrap angle on the first pressure cylinder, while the ply V3' follows the case of the examples of FIG. 6, i.e., it does not have a wrap angle on the first pressure cylinder, but directly on the first embossing cylinder, after its free section. Also in these cases, at least one steam distributor 28 can, for example, be provided positioned, for example, in the positions indicated in the previous figures, as moreover already indicated above, for example on the first embossing cylinder.

Figure 13:
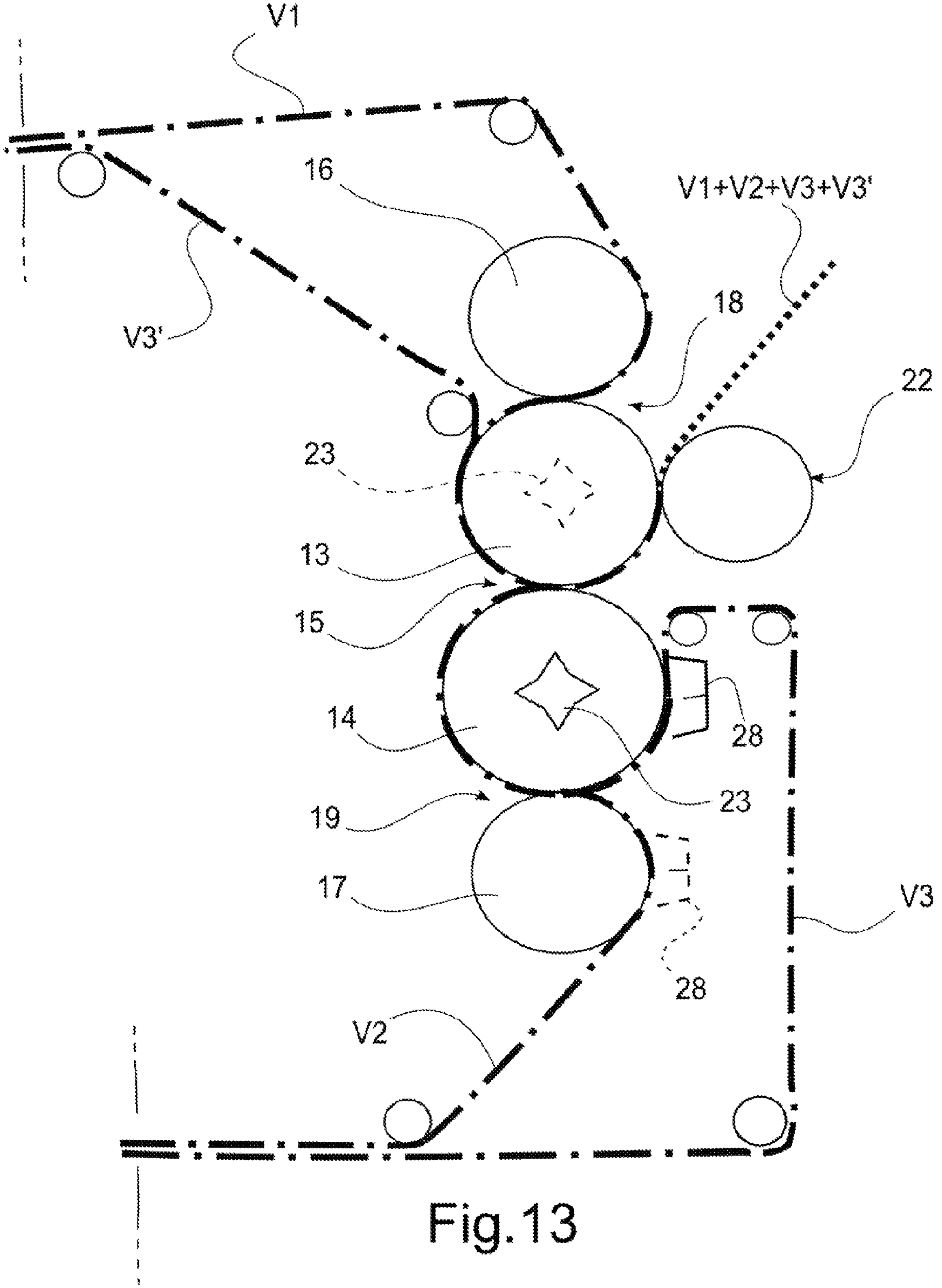

FIG. 13 shows a combination of the examples of FIGS. 11 and 12, so that four plies V1, V2, V3, V3' are present.

Figure 14:
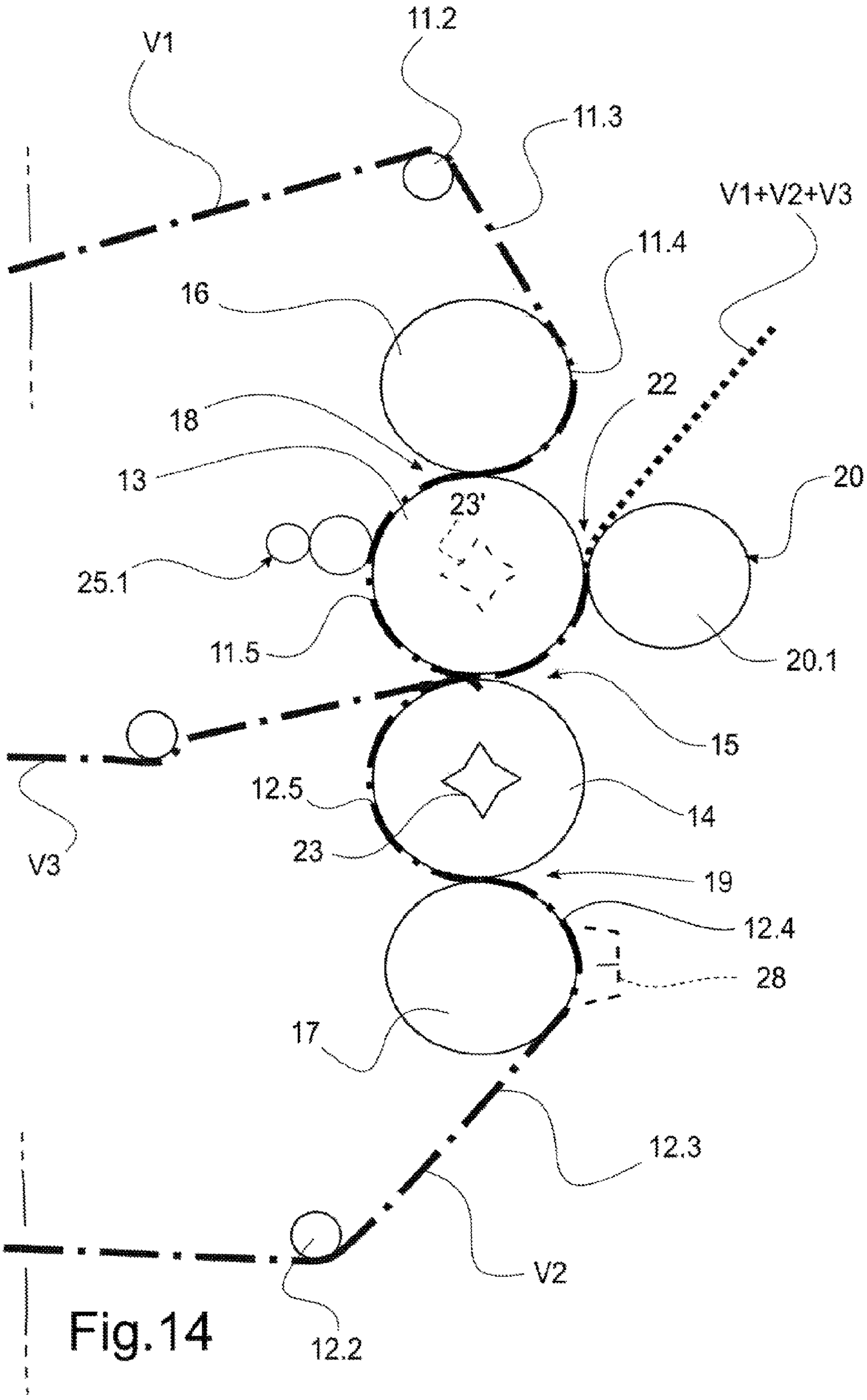

FIG. 14 shows a further variant of configuration for a third ply V3", which has a central feed path, adapted to feed the ply V3" directly through the transfer nip 15 between the embossing cylinders 13/14 and between the two plies V1 and V2, without any section wound around the embossing cylinders or the pressure cylinders, to then pass together therewith through the laminating nip, if the laminating device is provided.

Figure 15:
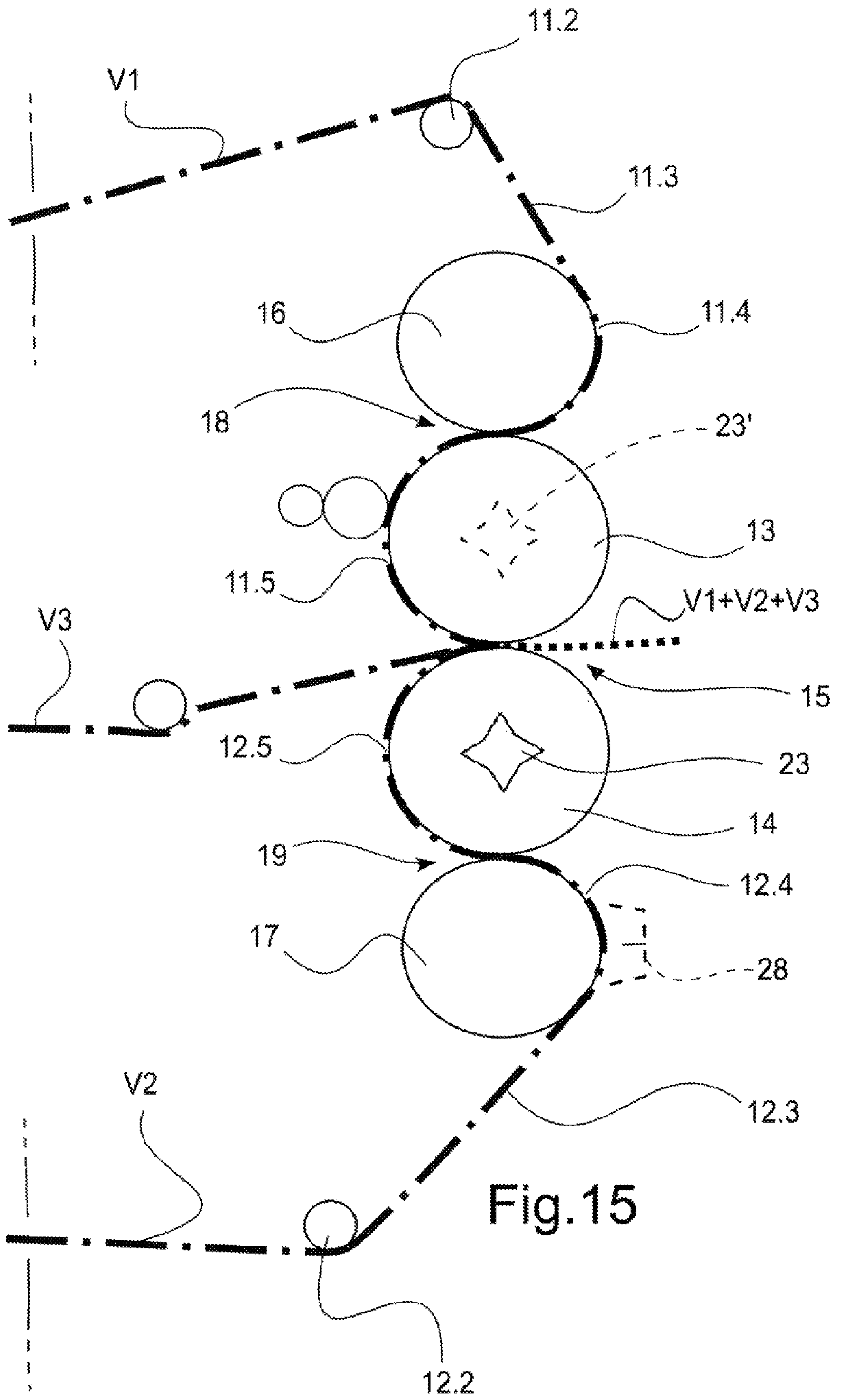

An example of configuration for three plies without pressing member (of the laminating device) is shown in FIG. 15. In this case, the embossing cylinders 13/14 are arranged in the tip-to-tip configuration, as explained in greater detail below, i.e., at least some tips 13.3 of the embossing protrusions 13.2 mate at least partially with the tips 14.3 of the embossing protrusions 14.2 in the transfer nip 15. The distance between a tip 13.3 and 14.3 in the transfer nip 15 is generally smaller than the thickness of the plies passing through the transfer nip 15. In some variants, it is possible to feed only the plies V1 and V2 into the transfer nip 15, without the third ply V3.

The transfer nip between first embossing cylinder and second embossing cylinder can be configured in various ways, valid for each example described above.

In a first configuration, known in the art as "DESL" (Double Embossing Synchronized Lamination), or "NESTED", the two embossing cylinders can be synchronized in rotation so that the first protrusions of the first embossing cylinder are centered in the spaces between the second protrusions of the second embossing cylinder (and vice versa), and therefore the raised elements generated on the first ply by the first protrusions coacting with the first pressure cylinder are nested in the recessed elements formed between the raised elements generated on the second ply by the second protrusions coacting with the second pressure cylinder, and vice versa, i.e., the raised elements of one ply are centered with, and preferably inserted into, the recessed elements of the other ply and vice versa.

In a second configuration, defined "tip-to-tip", the two embossing cylinders can be synchronized in rotation so that the tips of the first protrusions of the first embossing cylinder are centered with the tips of the second protrusions of the second embossing cylinder, and therefore the raised elements generated on the first ply by the first protrusions coacting with the first pressure cylinder are centered with the raised elements generated on the second ply by the second protrusions coacting with the second pressure cylinder, and vice versa. In this case there is no mutual penetration between the recessed elements of one ply and the raised elements of the other, but the two plies are in contact at the raised elements. Preferably, the distance between the tips of the protrusions of the two cylinders is smaller than the sum of the thicknesses of the two plies. FIG. 15 can represent a case with embossing cylinders configured "tip-to-tip" and also has a third ply arranged between the two plies mated tip-to-tip. Ply-bonding of the two or more plies usually takes place using a glue distributed on the tips of one of the two plies.

Figure 16:
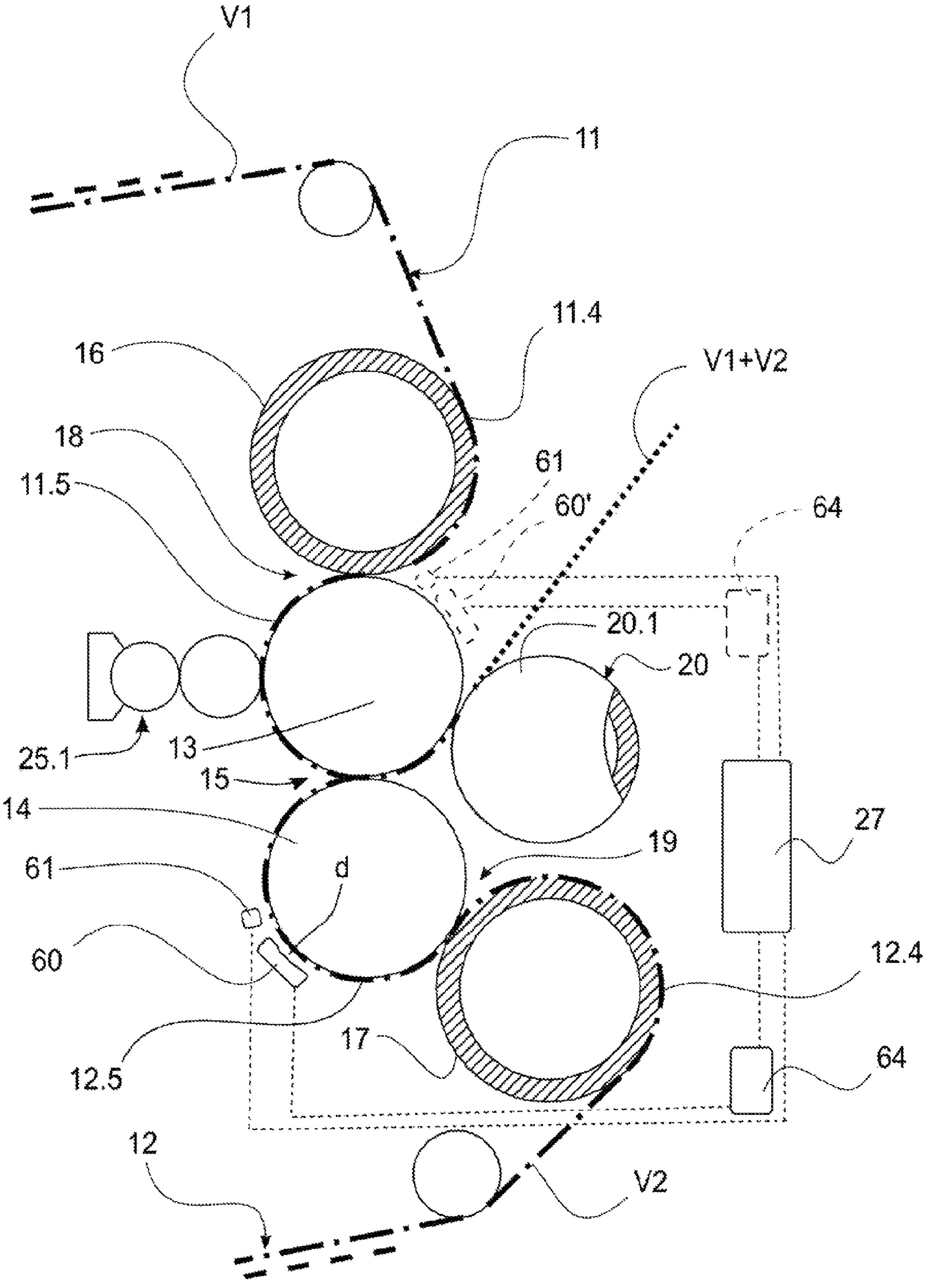

With regard to the external heating device 23.1 in the form of device facing the surface of the cylinder of magnetic induction type, this is indicated as a whole with 60, 60', and is represented, for example, in FIG. 16. As said, the surface of the embossing cylinder 13, 14 with which it is associated is heated by Joule effect through induction of eddy currents on this surface.

Preferably, taking the second embossing cylinder 14 as reference, the electromagnetic induction device 60 is positioned in an area comprised between the transfer nip 15 and the second embossing nip 19 relative to the second wrap angle section 12.5 of the ply V2, or on the opposite side of the second embossing cylinder, i.e., the side facing the laminating device 20.

The same applies in the case of the electromagnetic induction device 60' (indicated with a dashed line) associated with the first embossing cylinder 13, which can be positioned between the laminating device 20 and the first pressure cylinder 16, or on the first wrap angle section 11.5, for example between the first pressure cylinder 16 and the optional adhesive distribution device 25, or between this latter and the transfer nip 15.

A respective generator or inverter 64, capable of driving the suitable currents toward the induction device in order to obtain the desired heating, is associated with each electromagnetic induction device. In a preferred configuration of the invention, to regulate the desired temperature on the surface of the embossing cylinder a closed loop control system is produced, composed of at least one temperature sensor 61 of any type, such as thermocouples, pyrometers, thermal cameras or another suitable device, associated with a respective embossing cylinder and connected to the control unit 27, which based on an appropriate control algorithm controls the inverter 64 so as to stabilize a desired temperature on the outer surface of the embossing cylinder, as will be explained in greater detail below.

The generators 64 can be inverters that operate at a specific operating frequency approximately the same as the resonance frequency of the electrical circuit formed by the electromagnetic induction device 60 with the output of this inverter.

Figure 17:
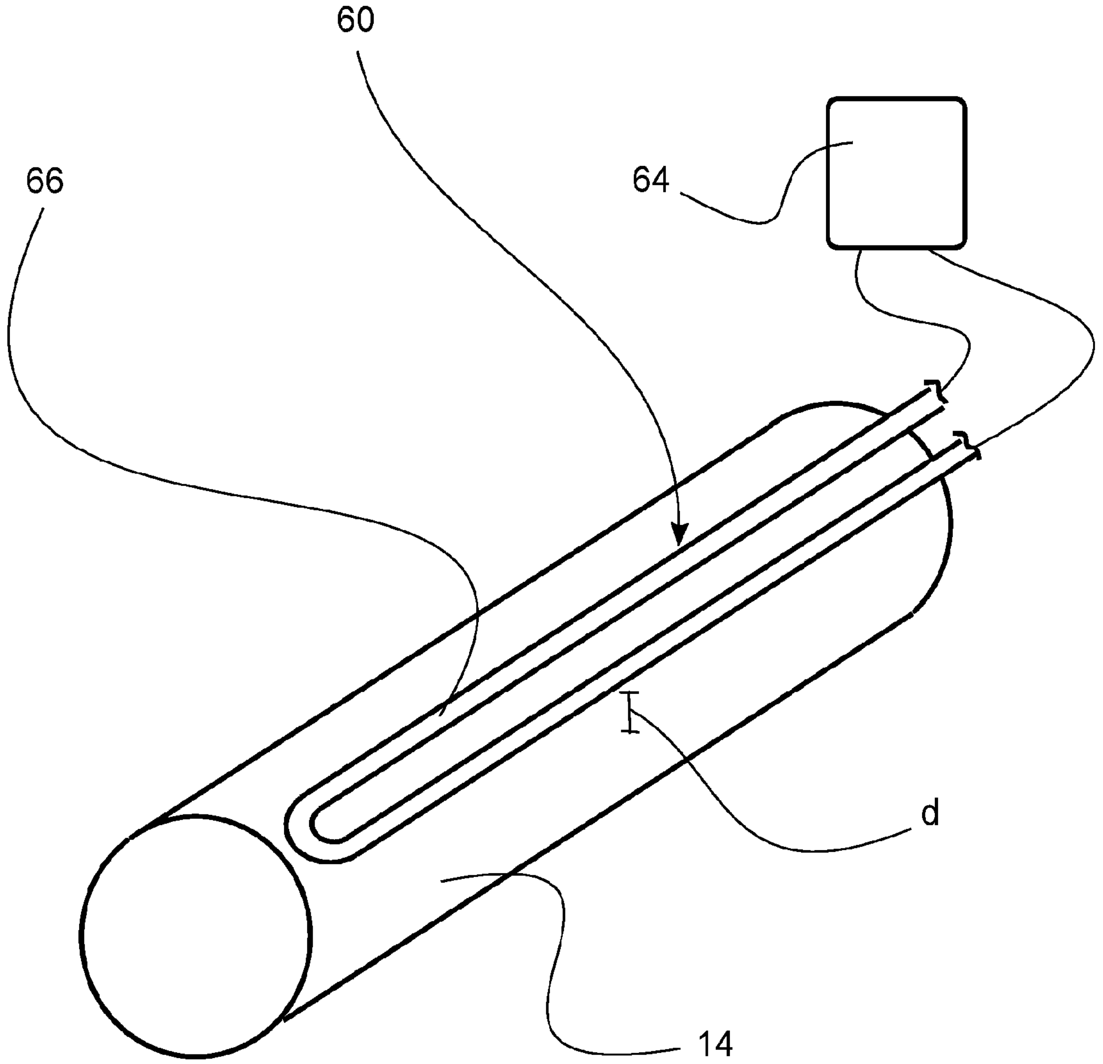
FIG. 17 shows a schematic view of an embossing cylinder with an electromagnetic induction device associated, in accordance with an embodiment of the machine according to the invention.

As shown schematically in FIG. 17, the induction device 60 can comprise a single coil 66 of conductive material such as copper or another suitable material, positioned approximately parallel to the axis of the embossing cylinder. In other configurations, the inductor 60 can comprise more than one coil.

In particularly advantageous embodiments, more than one induction device can be used for each embossing cylinder so as to obtain a surface temperature as even as possible. In this case, the inductors can be supplied by a same inverter or each by a respective inverter controlled by the central control unit 27 as a function of the temperature of the outer surface of the embossing cylinder detected by the temperature sensor or sensors.

The induction device 60 can be cooled with known devices. For example, a coolant can be made to flow inside the inductor 60, which in this case can be made with a copper pipe or of another conductive material.

In the operating step, the coil 66 of conductive material is supplied with an alternating current I1 and placed in an operating area at a distance d from the outer surface of the embossing cylinder. This creates a magnetic field B that is variable in time that penetrates the outermost part of the embossing cylinder inducing eddy currents Ip which, as explained previously, heat the embossing cylinder by Joule effect.

A regulator of the distance d (not shown in the figures) is preferably provided, which can thus be regulated to regulate the gap and optimize the magnetic flux, and can be between 1 mm and 8 mm.

In some cases, more than one temperature sensor can be used associated with a single embossing cylinder and, even more generally, more than one temperature sensor of different type can be used for each embossing cylinder, for example, one or more thermocouples, pyrometers and/or thermal cameras. Generally, the sensors are positioned externally to the embossing cylinder, but in some cases these sensors can be inserted inside the cylinder. For example, several thermocouples can be positioned inside the embossing cylinder at different depths to monitor the temperature of the cylinder along a radial direction, i.e., a direction inside the cylinder.

The use of thermal cameras can be preferred relative to other sensors, as they are able to provide a more complete overview of the temperature distribution on the surface of the embossing cylinders. For example, the embossing protrusions can be at a higher temperature relative to the bottom surface of the embossing cylinders, or vice versa and therefore the frequencies of the electromagnetic induction currents I1 supplied by the inverters 64 to the induction devices 60 must be changed and, in general suitably controlled. The eddy currents induced on the outer surface of the embossing cylinder generated by the magnetic field variable in time have a penetration depth within the cylinder that is a function of the magnetization frequency of the induction device 60.

In advantageous embodiments, the temperature profile of the outer surface of the embossing cylinder can be detected, highlighting any temperature differences between the embossing protrusions and the bottom surface and any temperature anomalies between the outer surface of the cylinder and the innermost part of the embossing cylinder. In this case, the central control unit 27 can control the inverters 64 to modify the frequency and/or the intensity of the electromagnetic induction currents I1 and obtain an optimal temperature profile, i.e., a temperature profile in which only the outer surface of the embossing cylinder is at the desired temperature. Advantageously, the operating frequency can therefore range from 500 Hz to 100 kHz, preferably from 1 kHz to 100 kHz, even more preferably from 5 kHz to 100 kHz, more preferably from 10 kHz to 60 KHz, i.e., frequencies in which the induced eddy currents Is are mostly confined on the embossing protrusions.

Figure 18:
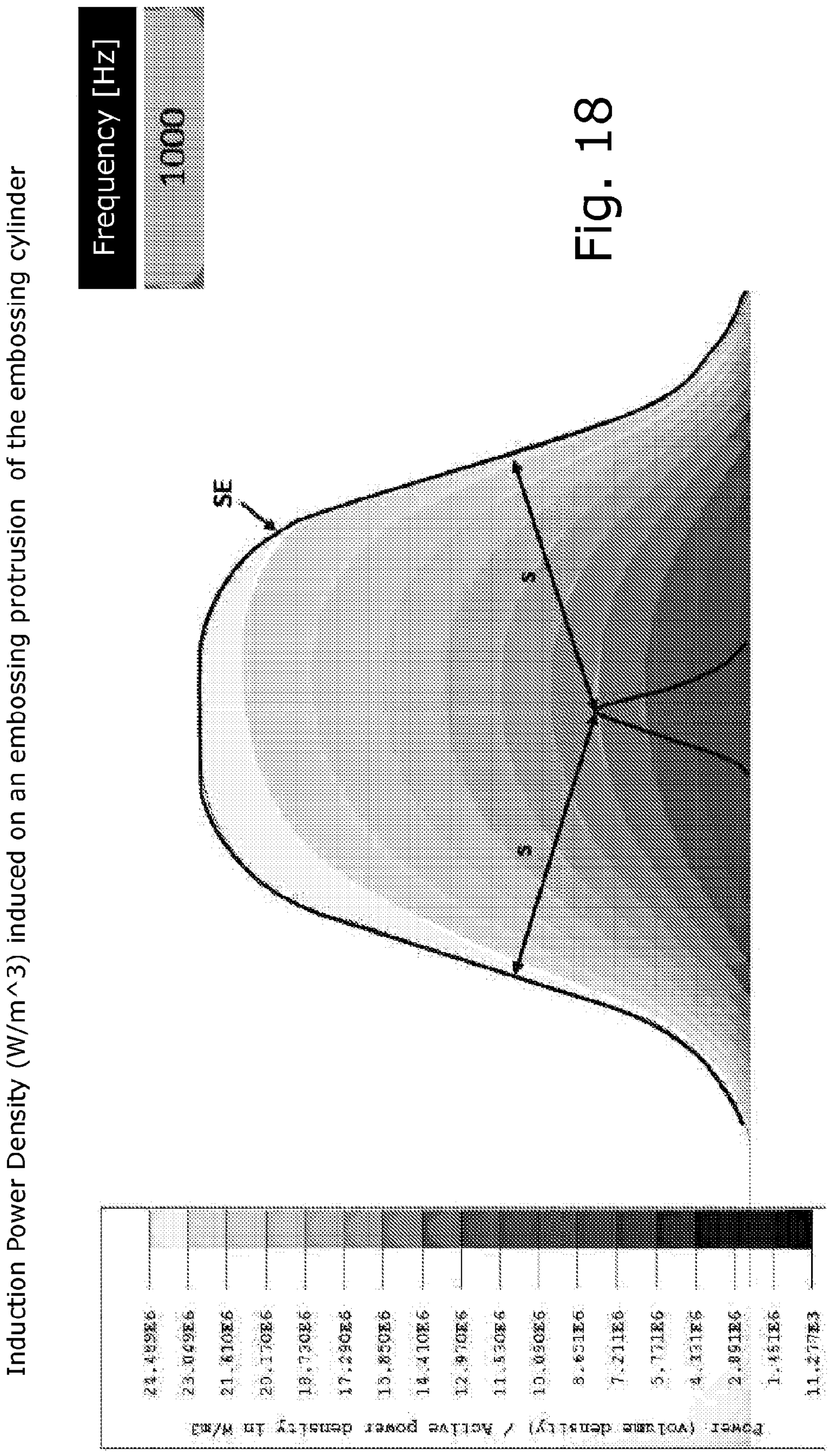
FIGS. 18 and 19 show a diagram relating to the induction power density (W/m$^3$) on a protrusion of an embossing cylinder like the one in FIG. 17, for an induction frequency of 1000 Hz and 10000 Hz, respectively.

As shown in FIG. 18, by supplying the induction device 60 with electromagnetic induction currents I1 at an operating frequency of around 1000 Hz, a distribution of the power density that follows prevalently the outer surface SE of one of the embossing protrusions can be obtained. In other words, a thickness S of the embossing cylinder, measured starting from the outer surface SE, contains a minimum value of power density equal to at least three quarters of the maximum value of power density. The thickness S can vary from a tenth of millimeter up to 5 tenths of millimeter. In the case of FIG. 18 (but also of the diagram of FIG. 2A or 2B), the thickness S is equal to 0.4 mm and contains a minimum power density equal to around three fifths of the maximum value of power density.

Figure 19:
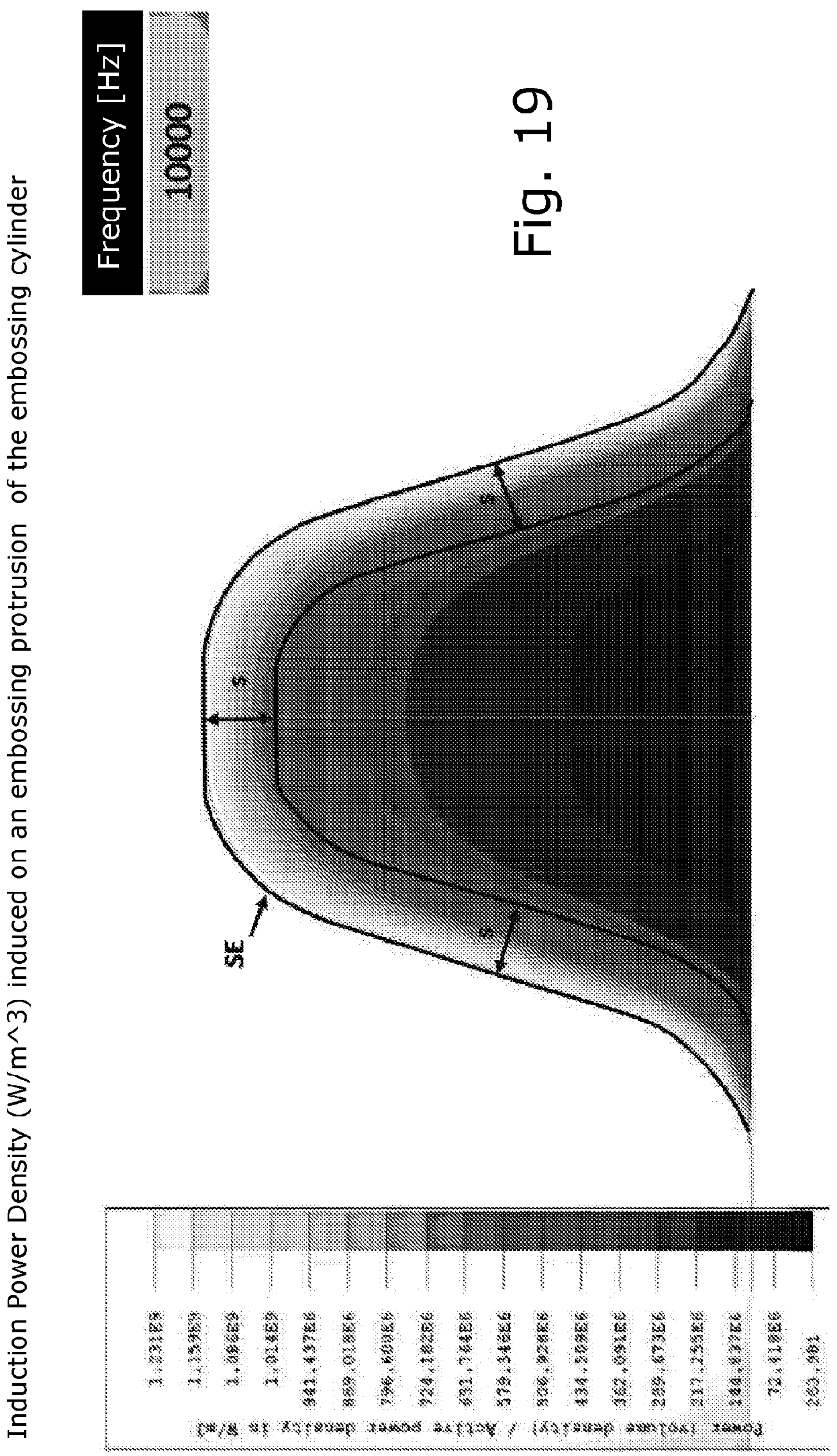

FIG. 19 shows an example in which the induction device 60 is supplied with electromagnetic induction currents I1 at an operating frequency of around 10000 Hz. In this case, the eddy currents and hence the distribution of power density, mostly follow the outer surface SE and consequently its profile. In this case, within the thickness S equal to around 0.1 mm the minimum power density is equal to one third of the maximum value of power density.

Only two examples are illustrated, showing how the induced eddy currents Is must preferably circulate in proximity of the outer surface SE of the embossing cylinder. In other words, they must be mostly confined within a limited thickness S of the outermost part of the embossing cylinder. Advantageously, the distribution of power density is such as to be able to consider the induced eddy currents Is prevalently on the embossing protrusions as well as on the bottom surface, i.e., the outer surface of the cylinder that separates each embossing protrusion.

In other embodiments, which can also be a function of the embossing pattern, i.e., of the size, shape and distribution of the embossing protrusions, the magnetic induction to device 60 can be regulated so as to keep the embossing protrusions at a higher temperature relative to the bottom surface. Advantageously, the control unit 27 controls the inverters 64 to keep only a very small surface thickness S at the desired temperature so as to reduce the energy required for heating and obtain a rapid cooling of the outer surface of the embossing cylinder.

It is understood that the above only represents possible non-limiting embodiments of the invention, the forms and arrangements of which may vary without departing from the concept on which the invention is based. The presence of any reference numbers in the appended claims has the sole purpose of facilitating reading of these claims in the light of the description above and of the accompanying drawings and do not in any way limit the scope of protection.

The invention claimed is:

1. A machine for embossing paper web products with two or more plies of paper web, comprising at least one pair of embossing nips for plies of paper, at least one laminating nip to bond said plies of paper, at least two feed paths for plies of paper from an entrance of the machine toward said at least one laminating nip, a pair of embossing cylinders, each embossing cylinder of said pair of embossing cylinders having on an outer surface thereof a respective plurality of embossing protrusions, said each embossing cylinder defining a section of one feed path of said at least two feed paths for at least one ply of said plies of paper in a form of a wrap angle for said at least one ply, and defining therebetween a transfer nip for said plies of paper, a pair of pressure cylinders, each pressure cylinder of said pair of pressure cylinders being side by side with a respective said embossing cylinder, said embossing nip being defined between each pair formed of said embossing cylinder and said pressure cylinder, a laminating device for assembly of said plies delivered from said transfer nip, to bond said plies, at least one distribution device of material to facilitate ply-bonding arranged along said one feed path of said at least one ply upstream of said laminating device, wherein said distribution device of material to facilitate ply-bonding comprises a steam distributor arranged along said one feed path of said at least one ply in said machine, adapted to distribute steam on said at least one ply, at least one heating device for at least one of said pair of embossing cylinders, wherein said at least one heating device comprises at least one electromagnetic induction device associated externally with a first embossing cylinder and/or a second embossing cylinder of said pair of embossing cylinders to heat an outer surface of said first embossing cylinder and/or said second embossing cylinder, said electromagnetic induction device being connected to a generator device to supply said electromagnetic induction device with electromagnetic induction currents adapted to generate an electromagnetic flow directed toward said first embossing cylinder and/or said second embossing cylinder, and wherein operating frequency of said electromagnetic induction currents is such as to generate eddy currents on said first embossing cylinder and/or said second embossing cylinder such as to prevalently follow a profile of the outer surface of said first embossing cylinder and/or said second embossing cylinder; and at least one temperature sensor adapted to detect temperature of said first embossing cylinder and/or said second embossing cylinder with which said at least one electromagnetic induction device is associated, and wherein said generator device is controlled by a central control unit as a function of the temperature detected by said first temperature sensor varying said operating frequency and/or intensity of said electromagnetic induction currents, and said central control unit is configured to vary the operating frequency and/or the intensity of said electromagnetic induction currents based on the temperature of said first embossing cylinder and/or said second embossing cylinder; wherein the temperature detected by said at least one temperature sensor is the temperature of the outer surface of said first embossing cylinder and/or second embossing cylinder.

2. The embossing machine according to claim 1, further comprising a system to control an amount of moisture that can be transferred from said steam distributor to said at least one ply, and said system configured to control the speed of the at least one ply to control the moisture imparted to the at least one ply;

wherein said system to control the amount of moisture that can be transferred is a function of feed speed of said at least one ply on which said material to facilitate ply-bonding is distributed along said feed path, so that when said speed increases, the amount of moisture transferred to said at least one ply decreases or increases.

3. The embossing machine according to claim 2, wherein said system to control the amount of moisture that can be transferred comprises a moisture sensor arranged on the feed path of said plies bonded downstream of said laminating device, operatively connected to said system to control the amount of moisture adapted to act on said steam distributor for regulation thereof.

4. The embossing machine according to claim 2, wherein said steam distributor is facing the wrap angle of one said embossing cylinder or one said pressure cylinder so as to apply a vapor to the at least one ply present on said embossing cylinder or on said pressure cylinder, or is arranged along a section of said feed path of the at least one ply in which said section is free hanging in air.

5. The embossing machine according to claim 2, wherein said at least one distribution device of material to facilitate ply-bonding further comprises a fluid adhesive material distributor.

6. The embossing machine according to claim 2, wherein said laminating device is provided with a pressing member defining a laminating nip with one said embossing cylinder, wherein said pressing member comprises a laminating cylinder facing said embossing cylinder to define said laminating nip, or a plurality of small rollers close to one another and defining a contrast surface.

7. The embossing machine according to claim 2, wherein said at least one heating device is associated with at least one said embossing cylinder and said wrap angle of said at least one embossing cylinder is comprised between 15° and 345°.

8. The embossing machine according to claim 2, wherein said at least one heating device is associated with at least one said embossing cylinder, a regulator of the embossing pressure being provided between said embossing cylinder and the respective said pressure cylinder, as a function of temperature of said embossing cylinder or of thermal expansion of said embossing cylinder.

9. The embossing machine according to claim 2, further comprising a first embossing cylinder of said pair of embossing cylinders and a second embossing cylinder of said pair of embossing cylinders defining therebetween said transfer nip, said laminating device being provided with a pressing member defining said laminating nip with said first embossing cylinder, the plies delivered from said transfer nip following, one in contact with another, a common section of wrap angle feed path around said first embossing cylinder and directed to said laminating nip; said first embossing cylinder being arranged over said second embossing cylinder.

10. The embossing machine according to claim 9 further comprising a first feed path of said at least two feed paths for at least one first ply of paper, comprising at least
  - a first wrap angle end section around said first embossing cylinder up to said transfer nip, a second feed path of said at least two feed paths for at least one second ply of paper, comprising at least
  - a second wrap angle end section around said second embossing cylinder up to said second transfer nip, a third section of feed path, common to said at least one first ply and said at least one second ply, from said transfer nip, in a form of a wrap angle around said first embossing cylinder up to said laminating nip.

11. The embossing machine according to claim 10, wherein said first feed path further comprises a first free section up to a first said pressure cylinder, a subsequent first wrap angle section around said first pressure cylinder that passes through said first embossing nip, a first end section.

12. The embossing machine according to claim 10, wherein said second path further comprises a second free section up to a second said pressure cylinder, a subsequent second wrap angle section around said second pressure cylinder that passes through said second said embossing nip, a second end section.

13. The embossing machine according to claim 10, wherein said first feed path further comprises a first free section up to a first said embossing cylinder, a subsequent first wrap angle section around said first embossing cylinder, that passes through said first embossing nip, a first end section.

14. The embossing machine according to claim 10, wherein said second path further comprises a second free section up to a second said embossing cylinder, a subsequent second wrap angle section around said second embossing cylinder, that passes through said second embossing nip, a second end section.

15. The embossing machine according to claim 10, wherein said first feed path comprises a first free section up to a first said embossing cylinder and said first end section, without passing through any embossing nip.

16. The embossing machine according to claim 10, wherein said second feed path comprises a second free section up to said second embossing cylinder and a second end section, without passing through any embossing nip.

17. The embossing machine according to claim 2, further comprising a steam distributor arranged along a feed path of said at least two feed paths of at least one ply in said machine, adapted to distribute steam on said at least one ply, in order to carry out a treatment of the at least one ply in addition to said distribution device of material to facilitate ply-bonding.

18. The embossing machine according to claim 2, wherein said system to control the amount of moisture that can be transferred comprises a regulator of flow rate or of pressure of the steam distributed.

19. The machine according to claim 1, wherein said eddy currents follow only or prevalently said embossing protrusions on said first embossing cylinder and/or said second embossing cylinder.

20. The machine according to claim 1, wherein said operating frequency of said electromagnetic induction currents ranges from 500 Hz to 100 kHz.

21. A machine for embossing paper web products with two or more plies of paper web, comprising at least one pair of embossing nips for plies of paper, at least one laminating nip to bond said plies of paper, at least two feed paths for plies of paper from an entrance of the machine toward said at least one laminating nip, a pair of embossing cylinders, each embossing cylinder of said pair of embossing cylinders having on an outer surface thereof a respective plurality of embossing protrusions, said each embossing cylinder defining a section of one feed path of said at least two feed paths for at least one ply of said plies of paper in a form of a wrap angle for said at least one ply, and defining therebetween a transfer nip for said plies of paper, a pair of pressure cylinders, each pressure cylinder of said pair of pressure cylinders being side by side with a respective said embossing cylinder, said embossing nip being defined between each pair formed of said embossing cylinder and said pressure cylinder, a laminating device for assembly of said plies delivered from said transfer nip, to bond said plies, at least one distribution device of material to facilitate ply-bonding arranged along said one feed path of said at least one ply upstream of said laminating device, wherein said distribution device of material to facilitate ply-bonding comprises a steam distributor arranged along said one feed path of said at least one ply in said machine, adapted to distribute steam on said at least one ply, at least one heating device for at least one of said pair of embossing cylinders; and a cooling system for the at least one embossing cylinder of said pair of embossing cylinders with which the at least one said heating device is associated, adapted to act to cool the at least one embossing cylinder during machine stoppage.

22. The machine according to claim 21, wherein said cooling system comprises at least one device for emitting cooling air toward said at least one embossing cylinder to be cooled.

23. The machine according to claim 22, wherein said cooling device is of an air blade type.

24. The machine according to claim 21, wherein said cooling device is of a vortex tube type.

25. The machine according to claim 21, wherein said cooling system comprises a device for distributing cooling liquid internally to said at least one embossing cylinder.

26. The machine according to claim 21, wherein said cooling system, when operating to carry out cooling, provides for:

moving said pressure cylinder and, when present, said laminating cylinder, away from a respective embossing cylinder, rotating said embossing cylinder with the cooling system operating.

* * * * *